United States Patent Office 3,836,544
Patented Sept. 17, 1974

3,836,544
SYNTHESIS OF ZEARALANES II AND RELATED COMPOUNDS AND INTERMEDIATES USEFUL IN THE SYNTHESES THEREOF
Wilbert Herbert Urry, Chicago, Ill., and Guy Towns Mullenbach, Berkeley, Calif., assignors to Commercial Solvents Corporation
No Drawing. Filed Apr. 25, 1972, Ser. No. 247,282
Int. Cl. C07d 7/120, 9/00
U.S. Cl. 260—343.2 R        17 Claims

ABSTRACT OF THE DISCLOSURE

This invention provides a new synthesis for norzearalane II and related compounds which related compounds and norzearalane II are represented by the formula

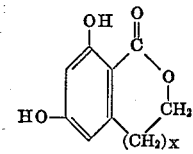

where X is an integer having a value from 1 to 13 inclusive.

The anabolic agent norzearalane II, in which $X=9$ in the foregoing formula, is prepared by a total chemical synthesis involving the reaction of 10-undecenal with malonic acid to produce trans-2,12-tridecadienoic acid; treating the acid so formed with diazomethane to yield methyl trans-2,12-tridecadienoate; reacting the methyl ester with ethyl acetoacetate and sodium ethoxide to form the sodium salt of ethyl 6-(9-decenyl)-β-dihydroresorcylate; brominating the dihydroresorcylate to prepare ethyl 3-bromo-6-(9-decenyl)-β-dihydroresorcylate; de-hydrobrominating the foregoing bromo derivative to give ethyl 6-(9-decenyl)-β-resorcylate; reacting the resorcylate ester with benzyl chloride to produce ethyl 6-(9-decenyl)-β-resorcylate dibenzyl ether; subjecting the benzylated ester to the action of diborane, water and hydrogen peroxide to form ethyl 2,4-bis(benzyloxy)-6-(10-hydroxydecyl)-benzoate; treating the foregoing benzoate with sodium ethoxide to prepare norzearalane II dibenzyl ether, and also to prepare as a by-product the dimeric dilactone of 2,4-bis(benzyloxy)-6-(10-hydroxydecyl)-benzoic acid; hydrogenating norzearalane II dibenzyl ether to form norzearalane II.

In general, a homologue of norzearalane II and/or of the corresponding dimeric dilactone is prepared by substituting for 10-undecenal in the foregoing sequence of reactions an unsaturated aldehyde having the formula:

where X is an integer which may have the value 1, 2, 3, 4, 5, 6, 7, 8, 9, 10, 11, 12 or 13.

Specifically zearalane II (where $X=10$) is prepared starting with 11-dodecenal and the dimeric dilactone from 6-(5-hydroxypentyl-β-resorcylic acid dibenzyl ether is prepared when the starting aldehyde is 5-hexenal (where $X=4$).

The invention also covers physiologically active compounds related to the zearalanes II and known as dimeric dilactones having the formula,

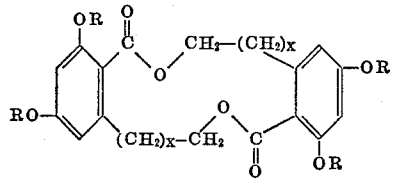

X is an integer which may have the value 1, 2, 3, 4, 5, 6, 7, 8, 9, 10, 11, 12 or 13, and where R is either hydrogen or a benzyl radical ($C_6H_5CH_2$—).

More particularly, this invention relates to novel intermediates produced in the synthesis of the above compounds and to processes for making these intermediates.

BRIEF SUMMARY OF THE INVENTION

This invention is directed to new and improved processes for the chemical synthesis of the physiologically active macrolides known as zearalanes II having the formula:

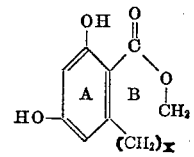

where X is an integer which may have the value 1, 2, 3, 4, 5, 6, 7, 8, 9, 10, 11, 12, or 13.

In the above formula, the letters A and B are used to denote the two different ring systems in the molecule.

It will be noted that in the compounds known as zearalanes II, the carbon atom attached to the oxygen atom of the carboxyl group has no chirality since it is also attached to two identical atoms (hydrogen). A zearalane II compound does not, therefore, exist in two isomeric forms.

More particularly this invention relates to novel intermediates produced in the synthesis of the foregoing compounds and to processes for making these intermediates.

It is the object of the present invention to provide a synthesis for new compounds known as zearalanes II which are related to zearalane.

It is another object of the present invention to provide syntheses for the zearalanes II as well as for certain of their derivatives.

It is a further object of the present invention to provide new processes for making intermediate compounds useful in the syntheses of the zearalanes II and their derivatives.

DETAILED DESCRIPTION

The zearalanes II and their derivatives are useful anabolic agents in the production of animals such as sheep and cattle. Zearalane II is a close relative of S-zearalane which in turn was produced from S-zearalenone, a natural product made by fermentation methods using the organism Gibberella zeae (Gordon) as described in U.S. Pat. 3,196,019.

The present invention is based on the discovery that the zearalanes II and their derivatives can be readily made by the sequence of reactions set forth in the following charts:

CHART—

I ----- "Reactions for the Chemical Synthesis of Norzearalane II."

II ---- "Reactions for the Chemical Synthesis of Zearalane II."

III ---- "Reactions for the Chemical Synthesis of the Tetrabenzyl Ether of the Dimeric Dilactone from 2,4-Bis(benzyloxy)-6-(5-hydroxypentyl)-benzoic Acid."

All of the reactions have been found to proceed in a straightforward manner and they require nothing other than apparatus and equipment found in the conventional chemical laboratory.

A. Norzearalane II
This compound has the formula
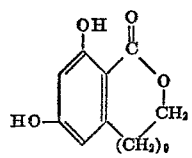
The first step in the synthetic sequence is the reaction of 10-undecenal with malonic acid to prepare *trans*-2,12-
CHART I
Reactions for the Chemical Synthesis of Norzearalane II
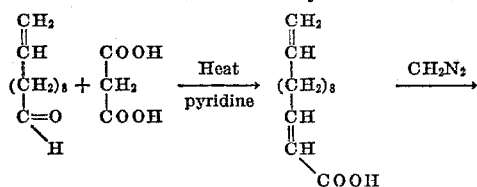
10-undecenal  malonic acid  I
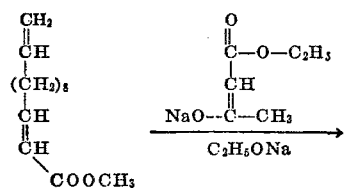
II
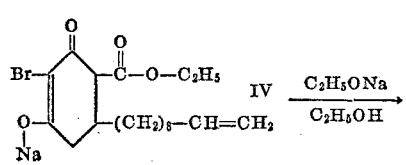
III
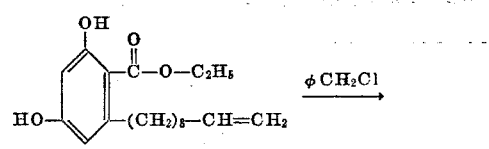
V
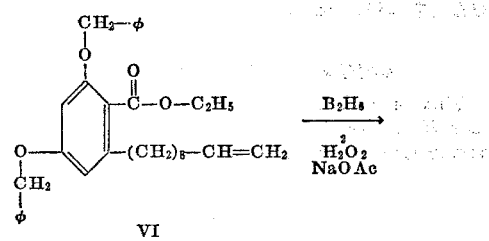
VI
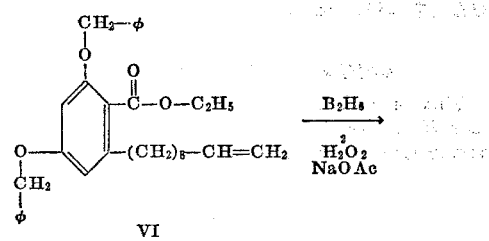
VII
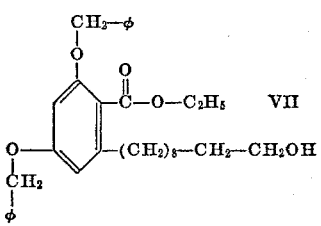
VIII
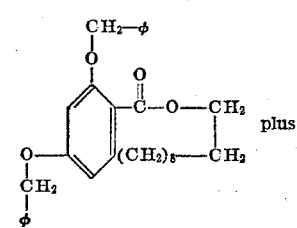
plus
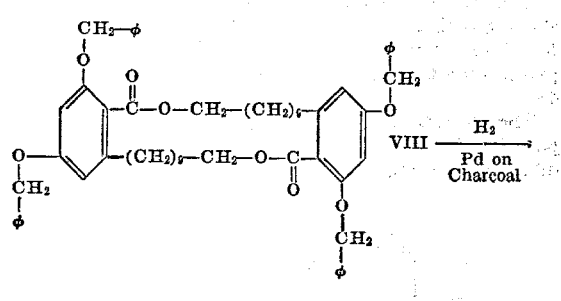
VIIIA

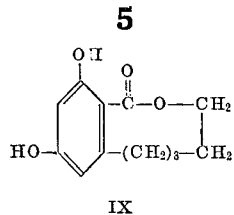

IX

Norzearalane II

NOTE: φCH₂Cl designates benzyl chloride; NaOAc is sodium acetate.

CHART II

REACTIONS FOR THE CHEMICAL SYNTHESIS OF ZEARALANE II

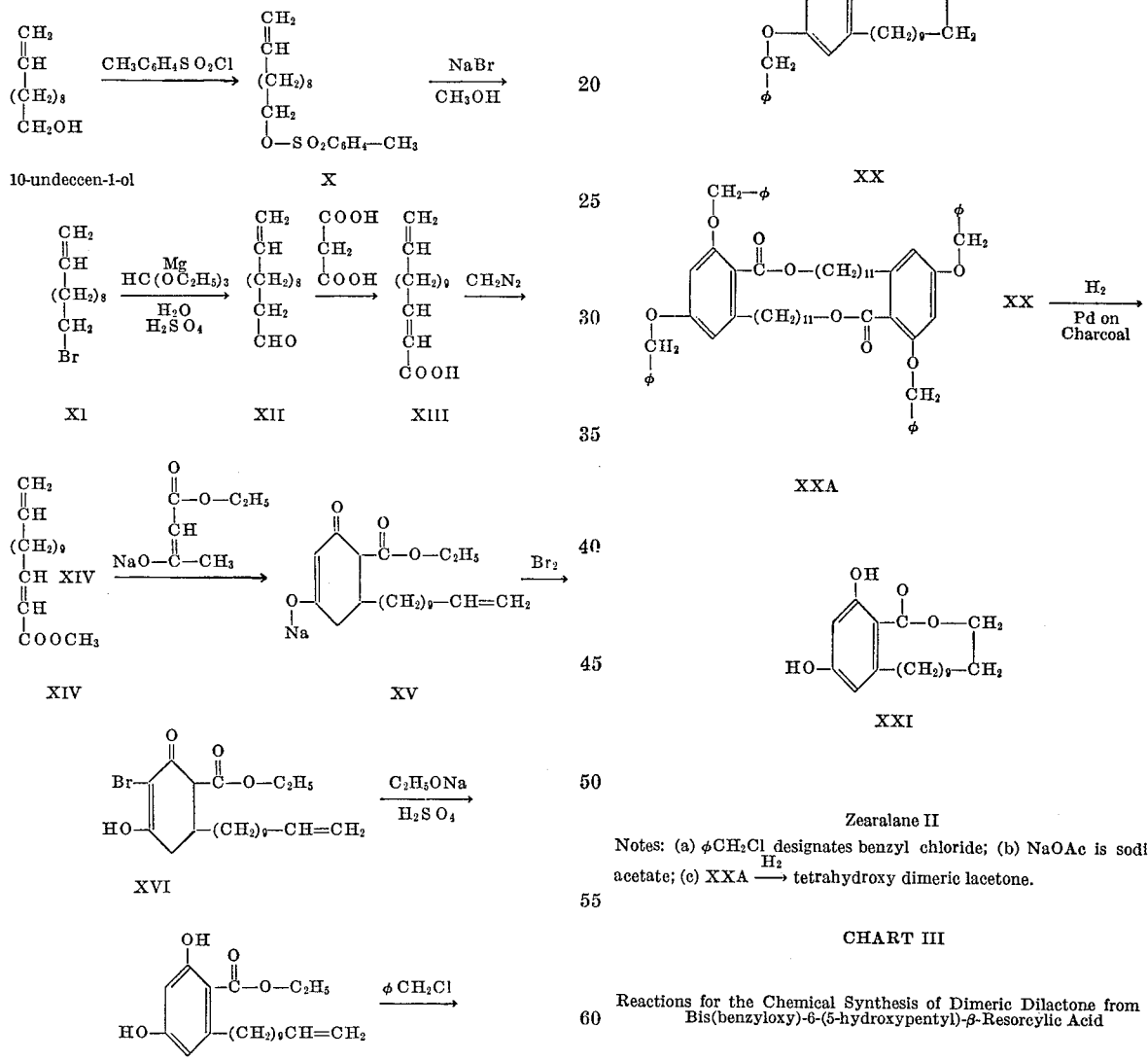

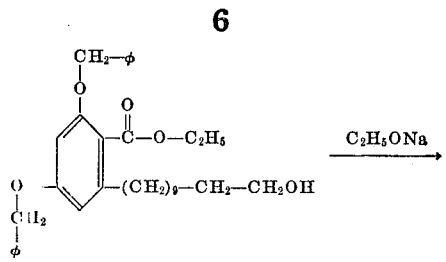

XIX

XX

XXA

XXI

Zearalane II

Notes: (a) φCH₂Cl designates benzyl chloride; (b) NaOAc is sodium acetate; (c) XXA $\xrightarrow{H_2}$ tetrahydroxy dimeric lacetone.

CHART III

Reactions for the Chemical Synthesis of Dimeric Dilactone from 2,4-Bis(benzyloxy)-6-(5-hydroxypentyl)-β-Resorcylic Acid

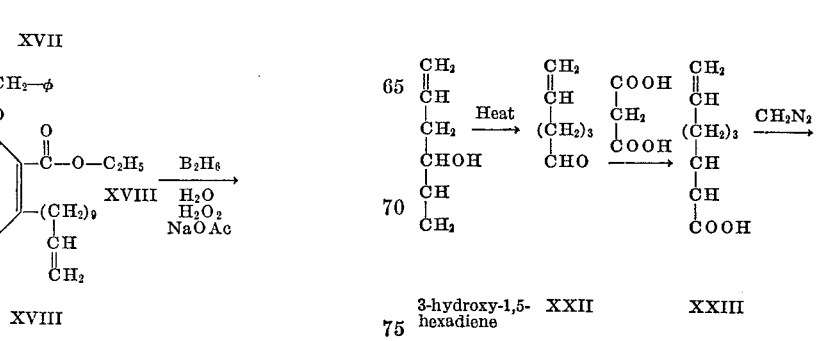

3-hydroxy-1,5-hexadiene  XXII  XXIII

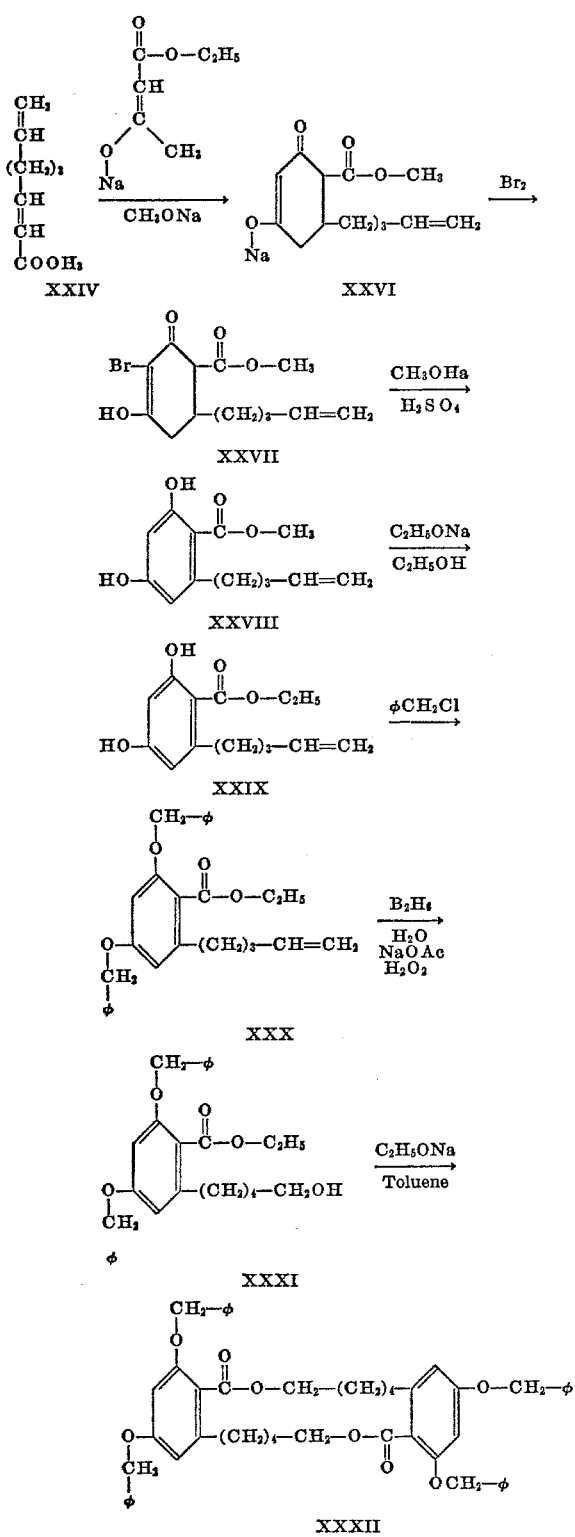

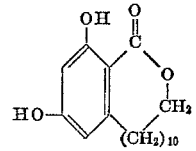

sodium ethoxide, ethyl alcohol, and acid to give ethyl 6-(9-decenyl)-β-resorcylate. The foregoing resorcylate is then reacted with benzyl chloride to prepare ethyl 6-(9-decenyl)-β-resorcylate dibenzyl ether. The benzylated ester is treated successfuly with diborane, water, hydrogen peroxide, and sodium acetate solution to form the primary alcohol, ethyl 2,4 - bis(benzyloxy) - 6-(10-hydroxydecyl)-benzoate. This primary alcohol is then reacted with sodium ethoxide in a toluene menstruum to produce norzearalane II dibenzyl ether and a by-product, the dimeric dilactone from 2,4 - bis(benzyloxy) - 6-(10-hydroxydecyl)-benzoic acid. Hydrogenation of norzearalane II dibenzyl ether under one atmosphere pressure of hydrogen and at room temperature using a palladium on charcoal catalyst yields norzearalane II.

B. Zearalane II

Zearalane II is represented by the formula

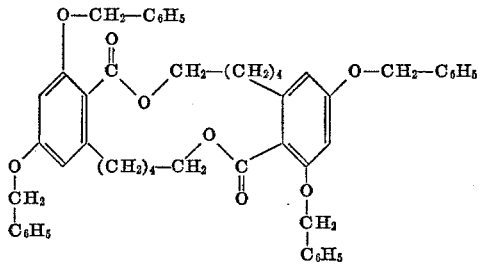

To start the sequence of reactions for the synthesis of zearalane II, 10-undecenol-1-ol is reacted with para-toluenesulfonyl chloride to give 10-undecen-1-yl p-toluenesulfonate which is then treated with sodium bromide in a methanol menstruum to produce 1-bromo-10-undecene. The foregoing bromo compound is subjected to a Grignard reaction with triethyl orthoformate to prepare 11-dodecenal which is reacted with malonic acid to yield trans-2,13-tetradecadienoic acid. The foregoing acid is reacted with diazomethane to produce the methyl ester which on treatment with ethyl acetoacetate in the presence of sodium ethoxide yields the sodium salt of ethyl 6 - (10 - undecenyl)-β-dihydroresorcylate. The dihydroresorcylate is brominated to prepare ethyl 3-bromo-6-(10-undecenyl)-β-dihydroresorcylate which is treated successively with sodium ethoxide and sulfuric acid to give ethyl 6-(10-undecenyl)-β-resorcylate. This resorcylic ester is benzylated using benzyl chloride and the resulting ethyl 6-(10-undecenyl)-β-resorcylate dibenzyl ether is subjected successively to the reagents diborane, water, sodium acetate, and hydrogen peroxide to give the primary alcohol, ethyl 2,4 - bis(benzyloxy) - 6-(11-hydroxyundecyl)-benzoate. The foregoing benzoate is reacted with sodium ethoxide to effect a ring closure and produce zearalane II dibenzyl ether and a by-product the dimeric dilactone from 2,4 - bis(benzyloxy) - 6 - (11-hydroxyundecyl)-benzoic acid. Hydrogenation of the foregoing ring compounds produces zearalane II and the dimeric dilactone from 6-(11-hydroxyundecyl)-β-resorcylic acid.

C. Tetrabenzyl Ether of the Dimeric Dilactone from 2,4-Bis(benzyloxy)-6-(5-Hydroxypentyl)-Benzoic Acid This compound has the formula The initial step in the synthesis of the above dimeric lactone is the pyrolysis at 380° C. of 3-hydroxy-1,5-hexadiene to yield 5-hexenal. The foregoing aldehyde is reacted with malonic acid to give 2,7-octadienoic acid which on treatment with diazomethane yields the methyl Tetrabenzyl ether of the Dimeric Dilactone from 2,4-Bis(benzyloxy)-6-(5-hydroxypentyl)-benzoic acid Notes: (a) φCH₂Cl designates benzyl chloride; (b) NaOAc is sodium acetate.

tridecadienoic acid followed by esterification of this acid with diazomethane. The methyl ester thus produced is reacted with ethyl acetoacetate under the influence of sodium ethoxide to yield the sodium salt of ethyl 6-(9-decenyl)-β-dihydroresorcylate. Bromination of the dihydroresorcylate produces ethyl 3-bromo-6-(9-decenyl)-β-dihydroresorcylate which is then treated successively with ester. The methyl ester is reacted with ethyl acetoacetate under the influence of sodium methoxide in a methanol menstruum to produce the sodium salt of methyl 6-(4-pentenyl)-β-dihydroresorcylate. This salt is then brominated to prepare methyl 3-bromo-6-(4-pentenyl)-β-dihydroresorcylate which is treated successively with sodium methoxide and sulfuric acid to produce methyl 6-(4-pentenyl)-β-resorcylate. The methyl resorcylate is converted to the ethyl ester by an interchange reaction with ethanol under the influence of sodium ethoxide. The ethyl resorcylate is reacted with benzyl chloride to yield ethyl 6-(4-pentenyl)-β-resorcylate dibenzyl ether. The benzylated resorcylate is then subjected successively to the action of diborane, water, sodium acetate solution, and hydrogen peroxide to prepare ethyl 2,4-bis(benzyloxy)-6-(5-hydroxypentyl)-benzoate. The foregoing ethyl benzoate is treated with sodium ethoxide in a toluene menstruum to effect a ring closure and yield the dimeric dilactone of 2,4 - bis(benzyloxy) - 6-(5-hydroxypentyl)-benzoic acid tetrabenzyl ether.

In the three reaction sequences exhibited in Charts I, II, and III, there is considerable diversity in the products obtained because of a variation in the tendency of the primary alcohols VII, XIX, and XXXI to form monomeric compounds. The reactions of these alcohols to form monomer and dimer are shown below.

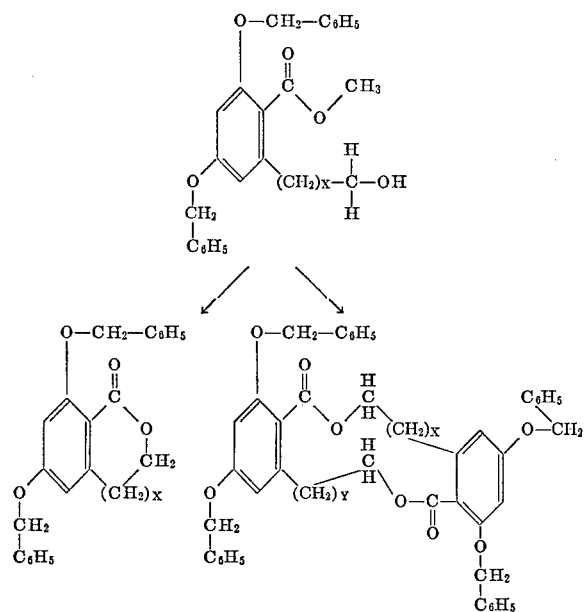

Whether monomer or dimer predominates, depends on the characteristics of the B-ring which is to be formed to give the monomer. Table I lists the various B-rings and indicates those in which monomer formation is most favorable.

TABLE I

Arbitrary scale of tendency of alkyl 2,4-bis(benzyloxy)-6-(X+1)-hydroxyalkyl)-benzoates to form monomers

| Value of "X" | Number of atoms in b-ring of monomer | Very low tendency=0, high tendency=10 |
|---|---|---|
| 1 | 6 | 10 |
| 2, 3, 4, or 5 | 7, 8, 9, or 10 | 0 |
| 6 or 7 | 11 or 12 | 2 |
| 8 | 13 | 4 |
| 9 | 14 | 5 |
| 10 | 15 | 6 |
| 11 | 16 | 8 |
| 12 | 17 | 9 |
| 13 | 18 | 10 |

The compounds produced by the process of this invention are useful in promoting the growth rate of meat-producing animals. The compounds can be administered to animals by any suitable method including subcutaneous injection of pellets under the skin of the ears of mammals as well as by oral and parenteral administrations. For example, the compounds can be formulated into pellets and put under the skin of the ear by a suitable gun or they can be suspended in a medium such as peanut oil and injected parenterally. The compounds can also be blended with ordinary feed containing nutritional values in an amount sufficient to produce the desired rate of growth and can thus be fed directly to animals.

When the compounds are to be fed directly to animals, the feed composition can be prepared containing the usual nutritionally balanced quantities of fats, carbohydrates, proteins, vitamins, and minerals together with the chosen compound. Some of these usual dietary elements are grains, such as ground grain and grain by-products; animal protein substances such as those found in fish meal and meat scraps; animal and vegetable fats; vegetable proteins like soybean oil meal and peanut oil meal; vitminaceous materials, e.g. vitamin A and D mixtures; riboflavin supplements and other vitamin B complex members; antibiotic supplements such as zinc bacitracin feed grade; and bone meal and limestone to provide minerals. A type of conventional feed material for use with cattle includes alfalfa hay and ground corn cobs together with supplementary antibiotics and vitaminaceous materials if desired.

The amount of compound administered to the animal, of course, depends upon the specific animal, its age and sex, and the desired rate of growth. Usually, administration of from about 1 to about 100 mg. of a compound per animal per day produces significantly increased growth rate.

The following examples serve to illustrate the invention and set forth the best mode contemplated by the inventors for carrying out the invention.

The abbreviations used in the following examples are described in these paragraphs. The description of a nuclear magnetic resonance (NMR) scan is identified by the letters NMR followed by the solvent and reference substance placed in parenthesis; thus, NMR (CDCl$_3$, TMS) means that the scan was made with deuterated chloroform as the solvent and tetramethylsilane as the reference substance. The position of the identified peaks may be described by the value:

δ=cycles per second from TMS divided by sixty (This relation applies with a 60 megaherz instrument)
  δ=c.p.s.÷60
or by τ=ten minus δ
  (10—δ)

The type of peak is shown by the first letter of the word describing the peak and is followed by a numeral indicating the number of hydrogen atoms involved. Examples are as follows:

s, 1 _____ Singlet, two hydrogens.
s, 2 _____ Doublet, one hydrogen.
d, 1 _____ Triplet, two hydrogens.
t, 2 _____ Multiplet, four hydrogens.
m, 4 _____ A broad singlet for one hydrogen which may result from OH, COOH, CHO.
Broad s, 1 ____ Singlet, one hydrogen.

Coupling constants are valuable for identification of the positions of hydrogen atoms and with respect to variations of the electronic environments. The coupling constants are measured as the distance between the peaks in question on the x-axis of the scan and are recorded as J values in terms of c.p.s.

Cycles per second are denoted by c.p.s. and by Hz.

In all of the examples, the temperatures are in degrees centigrade. In the NMR data, TMS is tetramethylsilane; DSS is sodium 2,2-dimethyl-2-silapentane-5-sulfonate.

EXAMPLE 1

Example 1 shows the preparation of *trans*-2,12-tridecadienoic acid by the following general reaction wherein $x=9$:

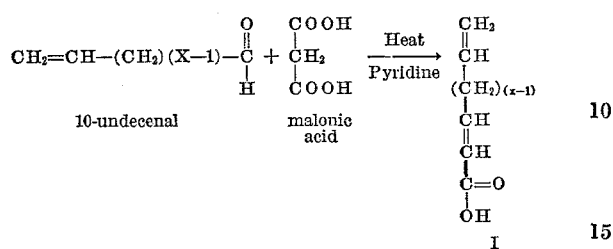

*trans*-2,12-Tridecadienoic Acid I. A reaction mixture containing 100.8 g., 0.599 mol, of 10-undecenal, 41.6 g., 0.398 mol, of malonic acid and 140 g. of pyridine was stirred at 25° for 24 hr. under nitrogen. After an additional 41.6 g. of malonic acid was added, it was again stirred for another 24 hr. at 25° C. Then it was heated on a steam bath until carbon dioxide evolution ceased (12 hr.). It was diluted with water (250 ml.), and the resulting mixture was extracted with ether (3x 200 ml.). The ether extract was washed with dilute hydrochloric acid (2 N, 4x 50 ml.), with water, and then dried (MgSO$_4$). Its distillation gave unreacted 10-undecenal (b.p. 40° at 1.0 mm.), and then 96.3 g., 0.458 mol (76%), of I: b.p. 164–65° (0.1 mm.); NMR (CDCl$_3$, TMS) δ12.66 (s, 1, COO$\underline{H}$), 7.22 and 6.96 (2 t, 1, $J_{AB}$=15.7 Hz., $J_{AX}$=7 Hz., C$\underline{H}_2$C$\underline{H}$=CH), 5.93 and 5.67 (2 t, 1, $J_{AB}$=15.7 Hz., $J_{AX}$=1 Hz., C$\underline{H}$CO), 5.72, 4.92 and 4.88, (3 m, 3, typical C$\underline{H}_2$=C$\underline{H}$), 2.08 (br m, 4, C$\underline{H}_2$CH=C), and 1.35 p.p.m. (br m, 12, CH$_2$(C$\underline{H}_2$)$_6$CH$_2$).

EXAMPLE 2

Example 2 illustrates the preparation of methyl *trans*-2,12-tridecadienoate by the following general reaction wherein $X=9$:

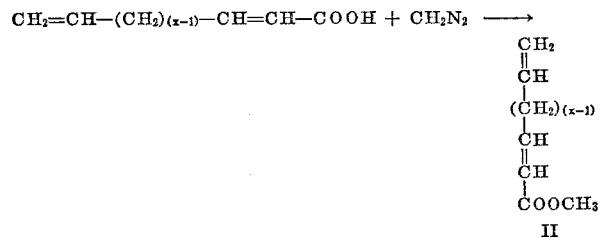

Methyl *trans*-2,12-Tridecadienoate II. A solution of diazomethane in ether was added to a stirred, cold (0°) solution of 95.0 g., 0.454 mol, of I in 150 ml. of ether until the yellow color persisted. The ether was evaporated to give 104.0 g. of the crude ester, that was distilled with a Nestor-Faust spinning band fractionating column to give 96.7 g., 0.422 mol (93%), of II: b.p. 112–113° (0.4 mm.); NMR (CDCl$_3$, TMS) δ7.07 and 6.81 (2 t, 1, $J_{AB}$=15.7 Hz., $J_{AX}$=7 Hz, CH$_2$C$\underline{H}$=CH), 5.91 and 5.65 (2 t, 1, $J_{AB}$=15.7 Hz., $J_{AX}$=1 Hz., C$\underline{H}$CO), 5.72, 4.92 and 4.88 (3 m, 3, C$\underline{H}_2$=C$\underline{H}$), 3.66 (s, 3, OC$\underline{H}_3$), 2.12 (br m, 4, C$\underline{H}_2$CH=C) and 1.34 p.p.m. (br m, 12, CH$_2$—(C$\underline{H}_2$)$_6$CH$_2$).

EXAMPLE 3

Example 3 exhibits the preparation of ethyl 6-(9-decenyl)-β-dihydroresorcylate and its sodium salt by the following general reaction wherein $X=9$:

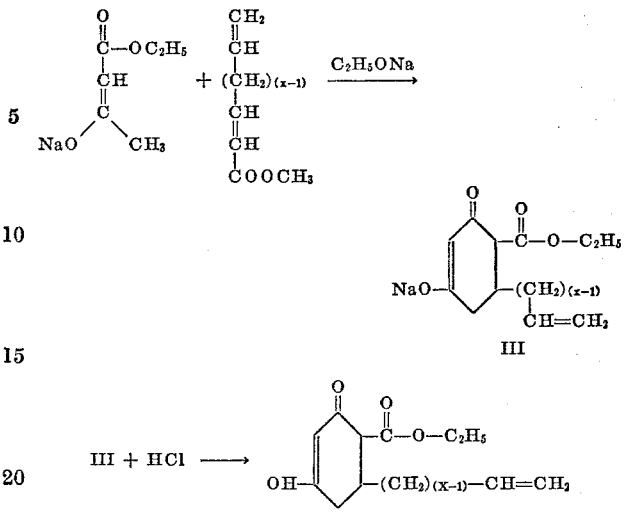

Ethyl 6 - (9 - decenyl) - β - Dihydroresorcylate and its Monosodium Salt III. 8.9 g., 0.404 g.-atom, of sodium was added to 130 ml. of anhydrous ethanol. After the reaction of sodium was complete, 50.5 g., 0.388 mol of freshly-distilled ethyl acetoacetate was added dropwise with stirring under nitrogen. This reaction mixture was held at reflux while 72.3 g., 0.323 mol, of II also was added dropwise over 1 hr., and then it was stirred for 20 hr. After the reaction mixture was cooled to 0°, the solid that had precipitated was removed on a filter and was washed with ether until it was white to give 89.2 g., 0.262 mol (84%), of the sodium salt III: NMR (D$_2$O, DSS) δ5.72, 4.92 and 4.88 (3 m, 3, C$\underline{H}_2$=C$\underline{H}$), 4.22 (q, 2, J=7 Hz., COOC$\underline{H}_2$)

3.18 and 2.20 (2 m, 3, ring tautomers), 2.00 (br m, 2, C$\underline{H}_2$CH=CH$_2$), and 1.28 p.p.m. (br m, 18,

and C$\underline{H}_3$).

A solution of 3.00 g., 0.00872 mol, of III in 50 ml. of water was made acidic with hydrochloric acid (3 N). The resulting mixture was extracted with ether (4× 25 ml.). The ether solution was washed with water (4× 25 ml.), and dried (MgSO$_4$). It was evaporated to give a residue that crystallized from ligroin (B.P. 60–68°) to yield 2.28 g., 0.00706 mol (81%) of the β-dihydroresorcylate from III: M.P. 59–60°; NMR (CDCl$_3$, TMS) δ6.80 (s, ca. 1, tautomeric hydroxyl), 5.72, 4.92 and 4.88 (3 m, 3, typical C$\underline{H}$=C$\underline{H}_2$), 4.20 (q, 2, J=7 Hz., COOC$\underline{H}_2$), 5.52, 3.15, 3.12 and 2.46 (4 m, ca. 4, ring tautomers), 2.06 (br m, 2, C$\underline{H}_2$CH=CH$_2$), 1.32 (br m, 15, C$\underline{H}$(CH$_2$)$_7$ CH$_2$), and 1.28 p.p.m. (t, 3, J=7 Hz, C$\underline{H}_3$). *Anal.* Calcd. for C$_{19}$H$_{30}$O$_4$: C, 70.8; H, 9.4. Found: C, 70.6; H, 9.5.

EXAMPLE 4

In Example 4, ethyl 3 - bromo - 6 - (9-decenyl)-β-dihydroresorcylate is produced by the following general reaction wherein X = 9:

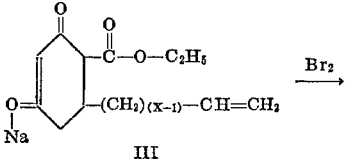

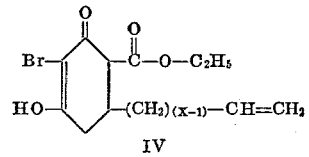

Ethyl 3 - bromo - 6 - (9 - decenyl) - β - dihydroresorcylate IV. A solution of 16.7 g., 0.104 mol, of bromine and 60.0 g., 0.58 mol, of sodium bromide in 200 ml. of water was added dropwise over 4 hr. to one of 34.5 g., 0.100 mol, of the sodium salt III in 700 ml. of water that was stirred rapidly at 0°. After 15 minutes of additional stirring, the flocculent solid that had precipitated was collected on a filter. It was dissolved in 200 ml. of ether, the ether solution was washed with water (3× 75 ml.), and briefly dried (MgSO$_4$, discolored with longer drying time). The ether solution was evaporated in a vacuum rotary evaporator (Rinco), and the residual product was recrystallized from 200 ml. of ligroin (B.P. 30–60°) to give 26.0 g., 0.0648 mol (65%), of white IV: M.P. 93–94°; NMR (CDCL$_3$ TMS) δ6.70 (br, s, ca. 1, 4–O$\underline{H}$), 5.72, 4.92 and 4.88 (3 m, 3, C$\underline{H}_2$=C$\underline{H}$), 4.22 (q, 2, J=7 Hz., COOC$\underline{H}_2$), 3.35, 2.72 and 2.43 (3 m, ca. 3, ring tautomers), 2.06 (br m, 2, C$\underline{H}_2$CH=CH$_2$), and 1.30 p.p.m. (br m, 18, C$\underline{H}$(C$\underline{H}_2$)$_7$C$\underline{H}_2$ and C$\underline{H}_3$). Anal. Calcd. for C$_{19}$H$_{29}$O$_4$Br: C, 56.9; H, 7.3; Br, 19.9. Found: C, 56.6; H, 7.3; Br, 20.2.

In Example 4, the temperature at which the reaction of bromine with Compound III is allowed to occur is kept at 0° C. in order to minimize the reaction of bromine with the double bond in the side chain of the compound. Temperatures up to 250° C. could be used for this reaction but 0° C. is preferred. A lower temperature limit of about −10° C. is set since the rate of the desired reaction becomes too low at temperatures much below −10° C., and the reaction mixture would probably freeze solid at temperatures much below −10° C.

EXAMPLE 5

In Example 5, ethyl 6-(9-decenyl)-β-resorcylate is prepared by the following general reactions where X=9:

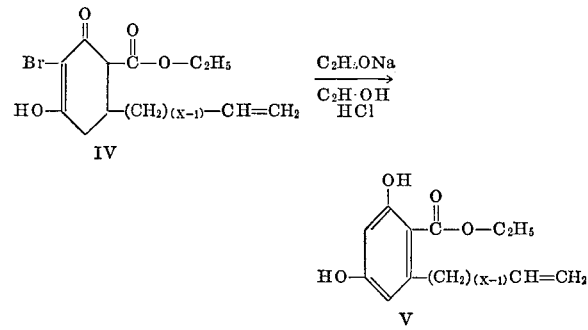

Ethyl 6 - (9 - decenyl)-β-resorcylate V. 45.0 g., 0.112 mol, of IV in a sodium ethoxide solution (prepared from 20.00 g., 0.870 g.-atom, of sodium in 500 ml. anhydrous ethanol) was held at reflux under nitrogen for 3 hr. Then, about 400 ml. of ethanol was evaporated under vacuum. The reaction mixture was diluted with water to 500 ml. while it was cooled in ice, and then it was acidified with hydrochloric acid (6 N). It was extracted with ether (3× 200 ml.), and the extract was washed with water (4× 200 ml.) until these washings were neutral to pH paper. This orange solution was decolorized with charcoal, and the ether was evaporated to yield 34.1 g. (95%) of crude V. A dry column chromatographic separation (680 g. Silica Gel H heated before use at 110° for 14 hr., 10% ethyl ether in methylene chloride), and recrystallization from ligroin (B.P. 30–60°), gave 19.0 g., 0.0594 mol (53%) of pure V: M.P. 45.5–46.5°; NMR (CDCl$_3$, TMS) δ11.88 (s, 1, hydrogen-bonded 2-O$\underline{H}$), 7.15 (br s, 1, 4-O$\underline{H}$), 6.33 and 6.30 (2 d, 2, J=2 Hz, aromatic C$\underline{H}$), 5.72, 4.92 and 4.88 (3 m, 3, C$\underline{H}_2$=C$\underline{H}$), 4.40 (q, 2, J=7 Hz, COOC$\underline{H}_2$), 2.83 (t, 2, J=6 Hz, ArC$\underline{H}_2$), 2.00 (m, 2 C$\underline{H}_2$CH=C), 1.40 (t, 3, J=7 Hz, CH$_3$), and 1.32 p.p.m. (m, 12, CH$_2$(C$\underline{H}_2$)$_6$CH$_2$). Anal. Calcd. for C$_{19}$H$_{28}$O$_4$: C, 71.2; H, 8.8. Found: C, 71.0; H, 8.6.

In Example 5 the dehydrobromination of compound IV can be effected at temperatures in the range of 60° C.–120° C. but a temperature near 80° C. is preferred. At a temperature of 80° C. the rate of dehydrobromination is reasonably fast.

The dehydrobromination step could be carried out in a menstruum of an alcohol other than ethanol, for example methanol or butanol.

EXAMPLE 6

In Example 6, ethyl 6 - (9 - decenyl)-β-resorcylate dibenzyl ether is formed by the following general reaction wherein X=9:

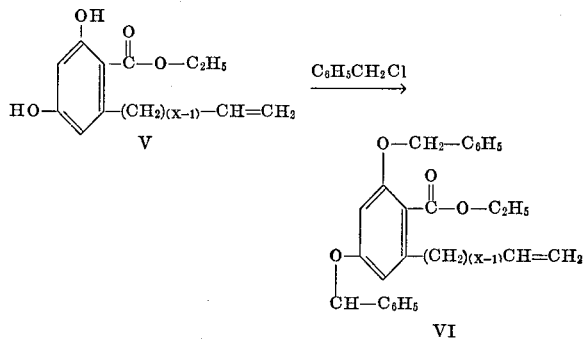

Ethyl 6 - (9 - decenyl) - β - resorcylate Dibenzyl Ether VI. A reaction mixture containing 9.00 g., 0.0281 mol, of V, 10.9 ml., 0.08972 mol, of benzyl chloride, and 20 g. of anhydrous potassium carbonate in 150 ml. of dried dimethyl sulfoxide was stirred while it was heated on a steam bath for 6 hr. Then 300 ml. of water was added to it. The oil that separated was taken into 200 ml. of ether, and 200 ml. of pentane was added to this extract. It was washed with water (8× 50 ml.) and dried (MgSO$_4$). Solvents were evaporated under vacuum to give 13.0 g., 0.0260 mol (92%), of VI that had the expected nmr spectrum; NMR (CDCl$_3$, TMS) δ7.24 (m, 10, C$_6$$\underline{H}_5$), 6.41 (s, 2, aromatic C$\underline{H}$), 5.72, 4.92 and 4.88 (3 m, 3, C$\underline{H}$=C$\underline{H}_2$), 4.90 and 4.87 (2 s, 4, benzyl C$\underline{H}_2$), 4.25 (q, 2, J=7 Hz, COOC$\underline{H}_2$), 2.58 (t, 2, J =6 Hz, ArC$\underline{H}_2$), 2.00 (m, 2, C$\underline{H}_2$CH=C), 1.28 (br m, 12, CH$_2$(C$\underline{H}_2$)$_6$CH$_2$), and 1.18 p.p.m. (t, 3, J=7 Hz., C$\underline{H}_3$).

EXAMPLE 7

In Example 7, ethyl 2,4-bis(benzyloxy)-6-(10-hydroxydecyl)-benzoate is made by the following general reactions where X=9:

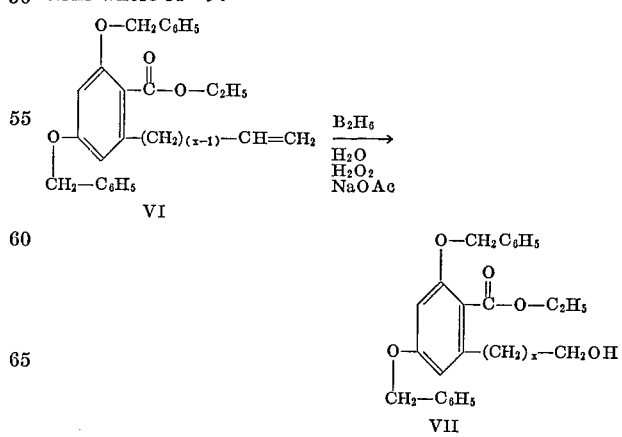

Ethyl 2,4 - bis(benzyloxy)-6-(10-hydroxydecyl)benzoate, VII. Ten ml. of 0.93 M-diborane (0.0093 mol) in tetrahydrofuran was dropped slowly into a stirred solution of 7.5 g (0.015 mol) of VI in 100 ml. of the same solvent held at 0° under nitrogen. Stirring was continued for 1 hr. at 0° and for 4 hr. at 25°. Then the reaction mixture was held at 0° while 10 ml. of water, 5 ml. of 3 M-sodium acetate, and 8.5 ml. of 30% hydrogen peroxide were successively added to it dropwise. After subsequent stirring for 1 hr., 200 ml. of ether was added. The ether phase was separated, and the aqueous one was extracted with ether (2× 100 ml.). The ether extract was washed with saturated brine, and then dried ($MgSO_4$). Its evaporation gave 6.8 g. of crude VII: yellow oil; TLC (9 $CH_2Cl_2$:1 Ether) major spot $R_f$ 0.65, and two minor ones $R_f$ 0.23 and 0.34; NMR ($CDCl_3$, TMS) δ7.30 (s, 10, $C_6\underline{H}_5CH_2$—), 6.42 (s, 2, resorcylate CH), 4.95 (s, 4, $C_6H_5C\underline{H}_2$—), 4.28 (q, 2, $CH_3C\underline{H}_2O$), 3.58 (m, 2, $C\underline{H}_2OH$), 2.58 (m, 2, $ArC\underline{H}_2$), and 1.28 p.p.m. (m, 19, $C\underline{H}_3CH_2O$ and $C\underline{H}_2$).

The reaction of the olefinic compound VI with diborane, water hydrogen peroxide and sodium acetate solution in Example 7 is carried out in the temperature range 0° C. to 25° C. This temperature range can be extended to 0° C. to 50° C., if it is desired to do so. At temperatures below 0° C. the reaction rates are low, and above 50° C. undesirable side reactions occur.

EXAMPLE 8

In Example 8, norzearalane dibenzyl ether and the dimeric dilactone tetrabenzyl ether are made by the following general reaction wherein X=9:

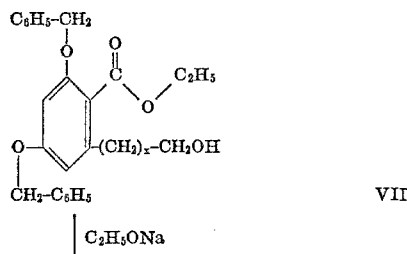

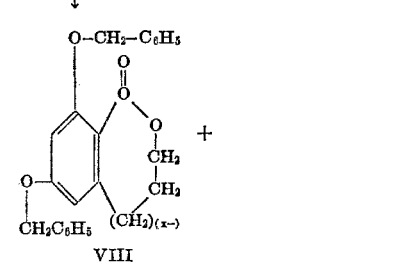

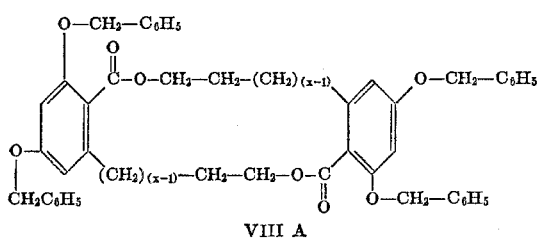

Norzearalane II dibenzyl ether, VIII. Solutions of 6.8 g. of the crude VII in 700 ml. of toluene (dried over sodium) and of sodium ethoxide prepared from 0.69 g. (0.03 g. at) of sodium with 50 ml. of absolute ethanol were mixed. The mixture was held under reflux under nitrogen while all of the ethanol and part of the toluene was distilled (2 ml./hr.) over 36 hr. through a fractionating column. Then it was cooled to 25°, and 500 ml. of water was added to it. Dilute hydrochloric acid was added until the aqueous phase was acidic. The toluene solution was separated and combined with ether extracts (2× 100 ml.) of the aqueous phase. This organic solution was washed with saturated brine, and dried ($MgSO_4$). Evaporation gave 6.5 g. of a yellow paste. Its solution in 24 ml. of ether was held at −20° for 12 hr., and 1.4 g. of a white solid crystallized. The solid was recovered on a filter and was washed with ether. The product in the ether filtrate was used to prepare IX (see Example 9). Since the mass spectrum of the 1.4 g. of solid indicated that it contained some dimeric dilactone tetrabenzyl ether VIIIA (parent mass 944), it was purified by dry column chromatography (Silica gel H, 9 $CH_2Cl_2$:1 ether). The TLC of the crude product showed some material at the origin with a major spot at $R_f$=0.74. All chromatographic fractions that contained only the latter (TLC) were combined and evaporated. Recrystallization of the residue from chloroform pentane gave VIII: mp 126–127°, 1.0 g., NMR ($CDCl_3$, TMS) δ7.36 (s, 10, $C_6H_5CH_2$), 6.44 (s, 2, $ArC\underline{H}$), 5.02 (s, 4, $C_6H_5C\underline{H}_2$), 4.22 (t, 2, J=5.5 Hz., —$C\underline{H}_2O$); 2.58 (m, 2, $ArC\underline{H}_2$—), and 2.01–1.1 with peak at 1.29 p.p.m. (m, 16, —$C\underline{H}_2$—); mass spectrum (70 e.v.) m/e (relative intensity) 472 (3.6), 454 (3.3), 382 (6.7), 364 (7.8), 293 (2.5), 275 (2.8), 181 (6.1), 180 (5.0), 91 (100), 65 (7.8), 63 (3.0), 55 (2.9), 41 (4.3), 39 (3.6). Anal. Calcd. for $C_{31}H_{36}O_4$: C, 78.78; H, 7.68. Found: C, 78.51; H, 7.72.

In Example 8, ring closure of compound VII is effected by heating the compound in a dry menstruum which is initially ethanol-toluene and which becomes toluene in the latter stages of the operation at a temperature in the range 75–110° C. This temperature range could be lowered somewhat but the reaction becomes very slow below 60° C. Temperatures above 110° C. can be used but at temperatures much beyond 120° C. undesirable reactions occur.

EXAMPLE 9

Example 9 shows the preparation of norzearalane dibenzyl ether by the following general reaction wherein X=9:

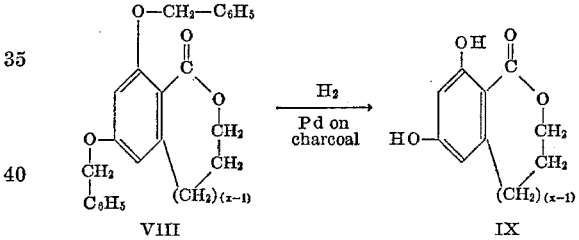

Norzearalane II, IX. The ether solution from Example 8 was evaporated to give 5.1 g. of crude VIII. A mixture of it with 50 ml. of ethanol, 50 ml. of ethyl acetate, and 1.5 g. of 10% palladium on charcoal with three drops of triethylamine was hydrogenated at 25° and 1 atm. until hydrogen consumption 0.022 mol) ceased. The reaction mixture was filtered, and the filtrate was evaporated to yield a brown semisolid. Dry column chromatography (9 $CH_2Cl_2$:1 ether, silica Gel H) gave early fractions that contained a single substance (TLC, $R_f$=0.62), and their evaporation gave 1.2 g. (0.004) mol, 35% yield from VI of crystalline solid.

Its recrystallization from chloroform-pentane gave pure IX, M.P. 150–151°; 0.45 g.; NMR ($CD_3COCD_3$, TMS) δ11.62 (s, 1, 2-O$\underline{H}$), 6.32 (d, 1, J=2 Hz., ArC$\underline{H}$), 6.24 (d, 1, J=2 Hz., ArC$\underline{H}$), 4.40 (m, 2, —$C\underline{H}_2O$—), 3.20 (bs, 1, 4-O$\underline{H}$), 2.83 (m, 2, ArC$\underline{H}_2$—), and 1.9–1.1 with peak 1.42 p.p.m. (m, 16, —$C\underline{H}_2$—); mass spectrum (70 eV) m/e (relative intensity) 292 (100), 197 (14), 178 (18), 177 (22), 168 (76), 164 (28), 163 (44), 151 (23), 150 (60), 124 (25), 69 (24), 55 (33), 41 (35). Anal. Calcd. for $C_{17}H_{24}O_4$: C, 69.83; H, 8.27. Found: C, 69.78; H, 8.24.

EXAMPLE 10

In Example 10, undecen-1-yl) p-toluenesulfonate is made by the following general reaction wherein X=10:

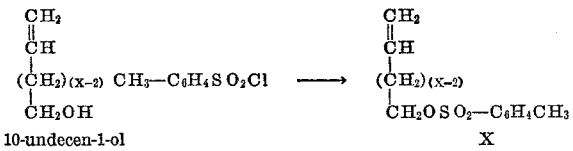

10-undecen-1-ol

10-Undecen-1-yl p-toluenesulfonate X. To a stirred solution of 100.0 g., 0.538 mol, of 10-undecen-1-ol in 190 ml. of pyridine protected by calcium chloride drying tube and cooled in an ice bath, 123.1 g., 0.646 mol, of p-toluenesulfonyl chloride was added at a rate that maintained the temperature below 10°. After this reaction mixture had been stirred at room temperature for 3 hr., it was acidified with 3 N hydrochloric acid while it was held at 0°. It was then extracted with ether (3 × 400 ml.) and the extract was washed with water (5 × 200 ml.). The ether solution was dried (MgSO$_4$), and the solvent was removed under vacuum to yield 163.9 g., 0.505 mol (94%), of X: NMR (CDCl$_3$, TMS) δ7.76 (d, 2, J=8 Hz., aromatic CH), 7.31 (d, 2, J=8 Hz., aromatic CH), 5.72, 4.92 and 4.88 (3 m, 3, CH=CH$_2$), 4.00 (t, 2, J=6 Hz., CH$_2$OS), 2.36 (s, 3, CH), 1.87 (br m, 2, CH$_2$CH=CH$_2$), and 1.23 p.p.m. (br m, 14, CH$_2$(CH$_2$)$_7$CH$_2$).

EXAMPLE 11

Example 11 illustrates the preparation of 1-bromo-10-undecene by the following general reactions wherein X=10:

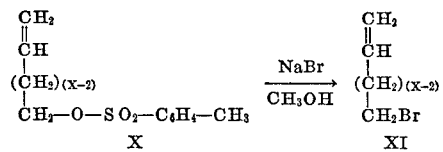

1-Bromo-10-undecene XI. A solution of 165.00 g., 0.509 mol, of X and 62.4 g., 0.607 mol of sodium bromide in 600 ml. of methanol (dried by distillation from sodium methoxide) was distilled until 50 ml. of the methanol had been removed, and then it was maintained under nitrogen at reflux for 6 hr. The solvent was removed under vacuum, 500 ml. of water was added to the residue, and the organic layer was extracted into ether (3 × 500 ml.). This extract was washed with water (3 × 300 ml.), dried (MgSO$_4$), and evaporated to yield 110.0 g. of a residue that was fractionally distilled to give 88.0 g., 0.378 mol, (74%) of XI: B.P. 76–77° (0.10 mm.); NMR (CDCl$_3$, TMS) δ5.72, 4.92 and 4.88 (3 m, 3, CH=CH$_2$), 3.37 (t, 2, J=7 Hz., CH$_2$Br), 2.00 (br m, 2, CH$_2$CH=CH$_2$), and 1.33 p.p.m. (br m, 14, CH$_2$(CH$_2$)$_7$CH$_2$).

EXAMPLE 12

Example 12 exhibits the preparation of 11-dodecenal by the following general reactions wherein X=10:

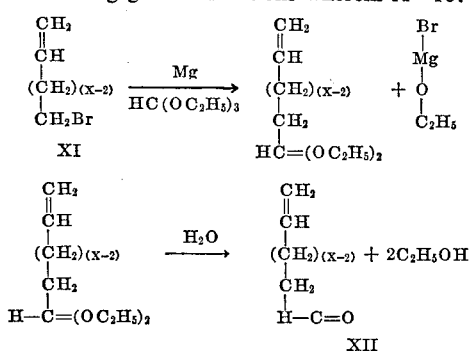

11-Dodecenal XII. With the usual procedure for the preparation of a Grignard reagent, a solution of 169.3 g., 0.727 mol, of XI in 500 ml. of anhydrous ether was added to 21.2 g., 0.872 g.-atom, of magnesium turnings with stirring. After the addition was complete, the reaction mixture was held at reflux for 2 hr. Then, a solution of 161.7 g., 1.09 mol, of triethylorthoformate (dried by distillation) in 200 ml. of anhydrous ether was added over 1 hr. while the reaction mixture was held at reflux. It was held at reflux for an additional 5 hr. Finally, it was cooled to 0° and stirred while 300 ml. of 3 N sulfuric acid was added to it. The ether layer was separated, and the aqueous phase was extracted with ether (2 × 200 ml.). The ether extract was washed once with water, and then it was evaporated. The residual product was treated with 200 ml. of 3 N sulfuric acid, and the mixture was heated on a steam bath with stirring for 3 hr. It then was extracted with ether (3 × 150 ml.). The extract was washed with water until these washings were neutral, and then was dried (MgSO$_4$). Distillation gave 82.0 g., 0.449 mol (62%), of XII: B.P. 99–100° (3.5 mm.), 48–49° (0.03 mm.); NMR (CDCl$_3$, TMS) δ1.64 (t, 1, J=1.5 Hz., CHO), 5.72, 4.12 and 4.88 (3 m, 3, CH=CH$_2$), 2.36 (m, 2, CH$_2$CO), 1.96 (br m, 2, CH$_2$CH=CH$_2$), and 1.30 p.p.m. (br m, 14, CH$_2$(CH$_2$)$_7$CH$_2$).

*Note:* The literature lists the boiling point of XII as 100–102° at 3.5 mm. M. Meyer, *Compt. Rend.*, 204, 508–9 (1937).

EXAMPLE 13

In Example 13, *trans*-2,13-tetradecadienoic acid is produced by the following general reaction wherein X=10:

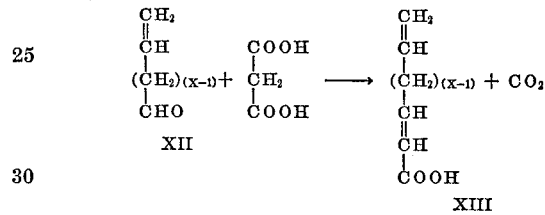

Preparation of *trans*-2,13-tetradecadienoic acid XIII. A reaction mixture containing 63.31 g., 0.348 mol, of XII, 39.80 g., 0.383 mol, of malonic acid and 75 ml. of pyridine was stirred at 25° under nitrogen for 109 hr., and then it was heated on a steam bath until carbon dioxide evolution ceased (13 hr.). Water (75 ml.) was added to it, and the resulting mixture was extracted with ether (2 × 200 ml.). The extract was washed with dilute hydrochloric acid (2 N, 2 × 50 ml.), with water, and then dried (Na$_2$SO$_4$). Its distillation gave 56.77 g., 0.253 mol, (73%) of *trans*-2,14-tetradecadienoic acid XIII: B.P. 140–141° (0.09 mm.); N$_D^{25}$ 1.4741; NMR (CDCl$_3$, TMS) δ11.54 (s, 1, COOH), 7.26 and 7.00 (2 t, 1, J$_{AB}$=15.7 Hz., J$_{AX}$=7 Hz., CH$_2$CH=CHCO), 5.98 and 5.70 (2 t, 1, J$_{AB}$=15.7 Hz., J$_{AX}$=1 Hz., CHCO), 5.72, 4.92 and 4.88 (3 m, 3, CH=CH$_2$), 2.12 (br m, 4, CH$_2$CH=C), and 1.32 p.p.m. (br m, 14, CH$_2$(CH$_2$)$_7$CH$_2$). *Anal.* Calcd. for C$_{14}$H$_{24}$O$_2$: C, 75.0; H, 10.8. Found: C, 7.50; H, 10.9.

EXAMPLE 14

In Example 14, methyl *trans*-2,13-tetradecadienoate is prepared by the following general reaction wherein X=10:

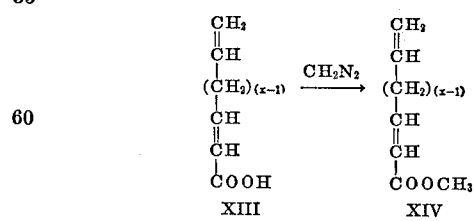

Methyl *trans*-2,13 - tetradecadienoate XIV. A solution of diazomethane in ether was added to a stirred, cold (0°) solution of 56.77 g., 0.253 mol, of XIII in 100 ml. of ether until its yellow color persisted. The ether was then evaporated to give 58.0 g. of crude ester. Its fractional distillation gave 52.89 g., 0.222 mol, (88%), of XIV: bp 120–123° (0.35 mm.); n$_D^{25}$ 1.486; NMR (CDCl$_3$, TMS) δ7.04 and 6.78 (2 t, 1, J$_{AB}$=15.7 Hz., J$_{AX}$=7 Hz., CH$_2$CH=CHCO), 5.87 and 5.61 (2 t, 1, J$_{AB}$=15.7 Hz., J$_{AX}$=1 Hz., CH=CHCO), 5.72, 4.92 and 4.88 (3 m, 3, C$\underline{H}$=CH$_2$), 3.67 (s, 3, C$\underline{H}_3$), 2.12 (br m, 4, C$\underline{H}_2$CH=C), and 1.30 p.p.m. (br m, 14, CH$_2$(C$\underline{H}_2$)$_7$CH$_2$).

Anal. Calcd. for C$_{15}$H$_{26}$O$_2$: C, 75.6; H, 11.0. Found: C, 75.8; H, 11.2.

EXAMPLE 15

In Example 15, the sodium salt of ethyl 6-(10-undecenyl)-β-dihydroresorcylate is formed by the following general reaction wherein X=10:

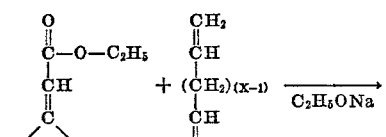

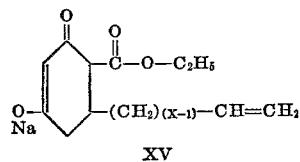

The sodium salt of ethyl 6 - (10-undecenyl)-β-dihydroresorcylate XV. When the reaction of 6.14 g., 0.267 mol, of sodium in 87 ml. of anhydrous ethanol was complete, 34.7 g., 0.267 mol, of freshly-distilled ethyl acetoacetate was added dropwise with stirring under nitrogen. Then, the reaction mixture was stirred at reflux while 52.89 g., 0.222 mol, of XIV was added to it dropwise. As it was heated for an additional 22 hr. and was subsequently cooled to 0°, a solid precipitated. It was recovered on a filter, and it was washed with ether until it was white to give 56.36 g. of XV. Additional such solid precipitated when 50 ml. of ether was added to the filtrate to give a total of 62.94 g., 0.176 mol, (79%) of XV: NMR (D$_2$O, DSS) δ5.72, 4.92 and 4.88 (3 m, 3, C$\underline{H}$=C$\underline{H}_2$), 4.22 (q, 2, J=7 Hz., COOC$\underline{H}_2$), 5.07, 3.18 and 2.20 (3 m, 4, ring tautomers), 2.00 (br m, 2, C$\underline{H}_2$CH=CH$_2$), and 1.28 p.p.m. (br m, 20, C$\underline{H}$(C$\underline{H}_2$)$_8$CH$_2$ and C$\underline{H}_3$).

EXAMPLE 16

Example 16 sets forth the conditions for making ethyl 3-bromo-6-(10-undecenyl) - β - dihydroresorcylate by the following general reaction wherein X=10:

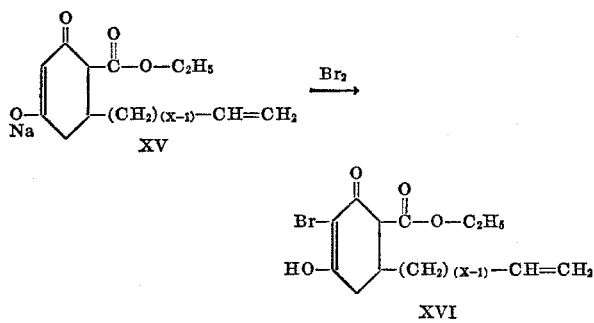

Ethyl 3-bromo-6-(10-undecenyl) - β - dihydroresorcylate XVI. A solution prepared from 15.18 g., 0.0950 mol, of bromine and 51.5 g., 0.500 mol, of sodium bromide and 200 ml. of water was added dropwise over 6 hr. to a rapidly stirred one of 34.00 g., 0.0950 mol, of XV in 800 ml. of water that was held at 0°. The color of the bromine solution was discharged as it was added, and a white solid precipitated. It was collected on a filter, and then was dissolved in 200 ml. of ether. The ether solution was washed with water (3× 75 ml.), and briefly dried (MgSO$_4$). This solvent was evaporated, and the residue was recrystallized from 200 ml. of ether to give 26.10 g., 0.0627 mol, (66%) of white XVI: mp 78–80°; NMR (CDCl$_3$, TMS) δ7.86 (s, ca. 1, 4-O$\underline{H}$), 5.72, 4.92 and 4.88 (3 m, 3, C$\underline{H}$=C$\underline{H}_2$), 4.22 (q, 2, J=7 Hz., COOC$\underline{H}_2$), 3.35, 2.72 and 2.43 (3 m, ca. 3, ring C$\underline{H}$ of tautomers), 2.06 (br m, 2, C$\underline{H}_2$CH=CH$_2$), and 1.30 p.p.m. (br m, 20, C$\underline{H}$(C$\underline{H}_2$)$_8$CH$_2$ and C$\underline{H}_3$). Anal. Calcd. for C$_{20}$H$_{31}$O$_4$Br: C, 57.8; H, 7.5, Br, 19.3. Found: C, 57.4; H, 7.5; Br, 19.6.

In Example 16, the temperature at which the reaction of bromine with compound XV is allowed to occur is kept at 0° C. in order to minimize the reaction of bromine with the double bond in the side chain of the compound. Temperatures up to 25° C. could be used for this reaction but 0° C. is preferred. A lower temperature limit of about —10° C. is set since the rate of the desired reaction becomes too low at temperatures much below —10° C., and the reaction mixture would tend to freeze solid at temperatures much below —10° C.

EXAMPLE 17

Example 17 illustrates the preparation of ethyl 6-(10-undecenyl)-β-resorcylate by the following general reactions wherein X=10:

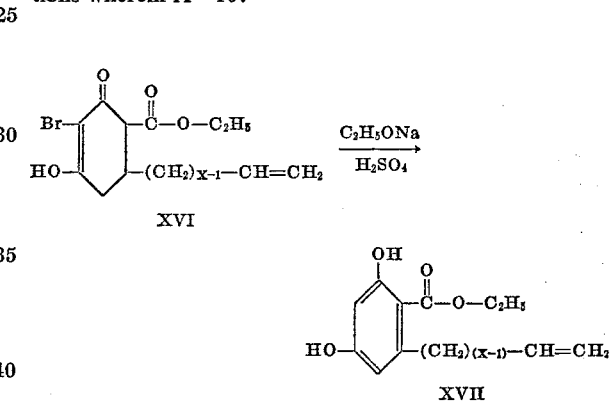

Ethyl 6-(10-undecenyl)-β-resorcylate XVII. A sodium ethoxide solution was prepared from 12.10 g., 0.527 g-atom, of sodium in 300 ml. of anhydrous ethanol, 48.49 g., 0.117 mol of XVI was added to it, and the mixture was held at reflux under nitrogen for 4 hr. About 200 ml. of ethanol was evaporated. The residual mixture was held at 0° while 400 ml. of water was added to it, and then it was acidified with 6N sulfuric acid. It was extracted with ether (3× 200 ml.) and the extract was washed with water (4× 200 ml.) until these washings were neutral to pH paper. The resulting orange solution was decolorized with charcoal, and the ether was evaporated to yield 37.06 g., 0.111 mol, (95%) of crude product. Dry column chromatography (750 g. Silica Gel H, 10% ethyl ether in methylene chloride) and the recrystallization of appropriate fractions from ligroin (B.P. 60–68°) gave 22.7 g., 0.0680 mol, (58%) of pure XVII: mp 55.5–56.5°; NMR (CDCl$_3$, TMS) δ11.92 (s, 1, 2-O$\underline{H}$), 7.64 (br s, 1, 4=O$\underline{H}$, 6.33 and 6.30 (2 d, 2, J=2 Hz., aromatic C$\underline{H}$), 5.72, 4.92 and 4.88 (3 m, 3, C$\underline{H}$=C$\underline{H}_2$), 4.40 (q, 2, J=7 Hz., COOC$\underline{H}_2$), 2.84 (t, 2, J=6 Hz., ArC$\underline{H}_2$), 2.03 (m, 2, C$\underline{H}_2$CH=CH$_2$), 1.40 (t, 3, J=7 Hz., C$\underline{H}_3$) and 1.32 p.p.m. (m, 14, CH$_2$(C$\underline{H}_2$)$_7$CH$_2$). Anal. Calcd. for C$_{20}$H$_{30}$O$_4$: C, 71.8; H, 9.0. Found: C, 71.5; H, 8.8.

In Example 17, the dehydrobromination of compound XVI can be effected at temperatures in the range 60° C–120° C. but a temperature near 80° C. is preferred. At a temperature of 80° C. the rate of dehydrobromination is reasonably fast.

The dehydrobromination step could be carried out in a menstruum of an alcohol other than ethanol, for example methanol or butanol.

EXAMPLE 18

Example 18 exhibits the preparation of ethyl 6-(10-undecenyl)-β-resorcylate dibenzyl ether by the following general reactions wherein X=10:

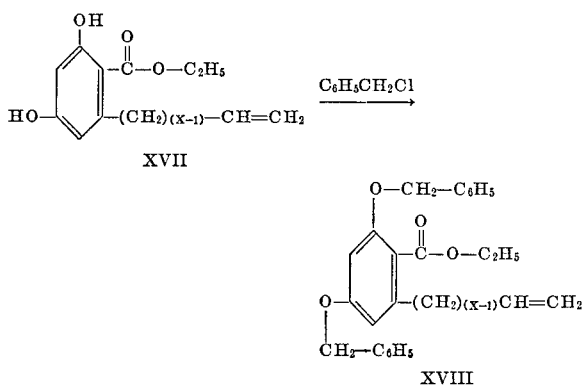

Ethyl 6-(10-undecenyl)-β-resorcylate dibenzyl ether XVIII. A reaction mixture containing 20.00 g., 0.0598 mol, of XVII, 40 g. of anhydrous potassium carbonate, and 20.0 ml., 0.174 mol, of benzyl chloride in 300 ml. of dry dimethyl sulfoxide was stirred and heated on a steam bath for 6 hr. Then 1.0 l. of water was added to it, and the oil that separated was extracted with 1.0 l. of a solution of 50% ether in pentane. The extract was washed with water (8× 100 ml.), and dried (MgSO$_4$). Evaporation under vacuum gave 28.0 g., 0.0543 mol, (91%) of XVIII with the expected NMR spectrum; NMR (CDCl$_3$, TMS) δ7.24 (m, 10, C$_6$H$_5$), 6.41 (s, 2, aromatic CH), 5.72, 4.92 and 4.88 (3 m, 3, CH=CH$_2$), 4.90 and 4.87 (2 s, 4, C$_6$H$_5$CH$_2$), 4.26 (q, 2, J=7 Hz, COOCH$_2$), 2.58 (t, 2, J=6 Hz, Ar—CH$_2$), 1.97 (m, 2, CH$_2$CH=CH$_2$), 1.28 (br m, 14, CH$_2$CH$_2$)$_7$CH$_2$), and 1.18 p.p.m t, 3, J=7 Hz, CH$_3$).

EXAMPLE 19

In Example 19, ethyl 2,4-bis(benzyloxy)-6-(11-hydroxyundecyl)-benzoate is produced by the following general reactions wherein X=10:

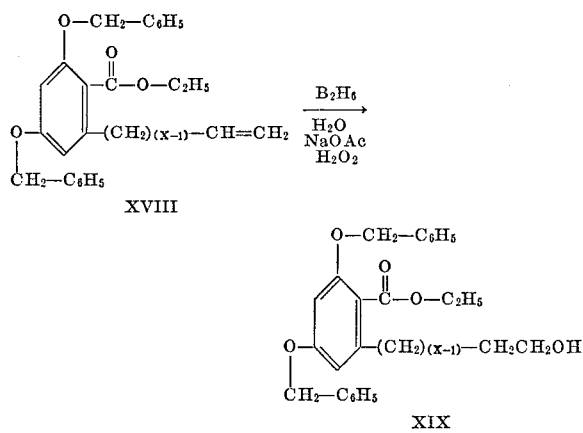

Ethyl 2,4 - bis(benzyloxy) - 6-(11-hydroxyundecyl)-benzoate, XIX. Over a period of 30 min., 13.0 ml. of 0.93 M-diborane (0.012 mol) in tetrahydrofuran was added dropwise to a solution of 10.28 g. (0.020 mol) of XVIII in 50 ml. of tetrahydrofuran stirred at 0° under nitrogen. A further 1 hr. at 0° and 4 hr. at 25° was allowed. Then 10 ml. of water was added over 10 min. After the addition of 20 ml. of 3 N-sodium acetate solution, 20 ml. of 30% hydrogen peroxide solution was dropped in over 20 min., and the reaction mixture was stirred for another 30 min. It was extracted with ether (5× 50 ml.), and the extract was washed with saturated brine and dried (MgSO$_4$). Evaporation gave 9.5 g. of a yellow oil. Although its thin layer chromatography showed that it contained two components (silica gel, 9CH$_2$Cl$_2$:1 ether, major R$_f$ 0.54 minor R$_f$ 0.32), the major one was XIX: NMR (CDCl$_3$, TMS) δ7.27 (s, 10, C$_6$H$_5$CH$_2$—), 6.40 (s, 2, ArCH), 4.92 (s, 4, C$_6$H$_5$CH$_2$—), 4.28 (q, 2, J=7.0 Hz, CH$_3$CH$_2$O—), 3.73 (m, 2, —CH$_2$OH), 2.58 (m, 2, ArCH$_2$—), 1.9–1.0 with peak at 1.29 p.p.m. (m, 21, —CH$_2$(CH$_2$)$_9$—CH$_2$ over CH$_3$CH$_2$O—).

The reaction of the olefinic compound XVIII with diborane, water, hydrogen peroxide and sodium acetate solution in Example 19 is carried out in the temperature range 0° C. to 25° C. This temperature range can be extended to 0° C. to 50° C., if it is desired to do so. At temperatures below 0° C. the reaction rates are low, and above 50° C. undesirable side reactions occur.

EXAMPLE 20

Example 20 exhibits the preparation of zearalane II dibenzyl ether plus some dimeric dilactone tetrabenzyl ether by the following general reaction wherein X=10:

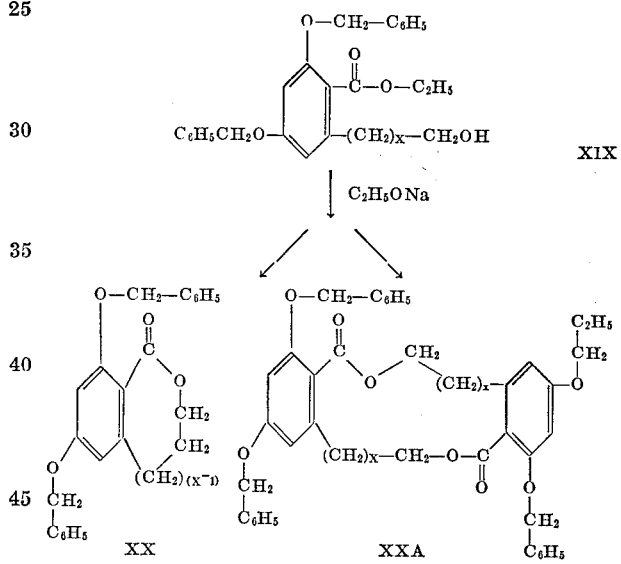

2,4-Bis(benzyloxy) Zearalane II dibenzyl ether, XX. After excess ethanol had been distilled as the ethanol-toluene azeotrope, a reaction mixture containing 7.98 g. (0.015 mol) of crude XIX, sodium ethoxide solution from 0.69 g. (0.015 g. atom) of sodium with 50 ml. of ethanol, and 800 ml. of toluene (dried over sodium) was held at reflux under nitrogen for 36 hr. Then it was cooled to 25°, 500 ml. of water was added to it, and it was made acidic with dilute hydrochloric acid. The toluene solution was separated, and the aqueous phase was extracted with ether. Toluene and ether solutions were combined, washed with saturated brine and dried (MgSO$_4$). Evaporation gave 7.5 g. of a semisolid product mixture that contained three substances (TLC as above, major R$_f$ 0.67 and minor R$_f$ 0.31 and 0.18). Dry column chromatography as above gave a series of fractions R$_f$ 0.67 that were evaporated to give 3.2 g. (0.0065 mol, 44% assuming starting XIX pure) of white solid XX: M.P. 175–176° from ether-pentane; NMR (CDCl$_3$, TMS) δ7.30 (s, 10, C$_6$H$_5$CH$_2$—), 6.42 (s, 2, ArCH), 4.97 (s, 4, C$_6$H$_5$CH$_2$—), 4.27 (t, 2, J=6.0 Hz., —CH$_2$O), 2.58 (m, 2, ArCH$_2$), and 1.9–1.0- peak 1.28 p.p.m. (m, 18, —CH$_2$(CH$_2$)$_9$CH$_2$—); mass spectrum (70 eV) m/e (rel. intensity) 486 (2), 468 (2), 396 (3), 378 (5), 307 (1), 289 (2), 181 (4), 180 (3), 128 (3), 127 (2), 92 (12), 91 (100), 65 (8), 63 (3), 55

(2), 51 (2), 44 (5), 41 (3), 39 (4). *Anal.* Calcd. for C$_{32}$H$_{38}$O$_4$: C, 78.98; H, 7.87. Found: C, 78.96; H, 7.95.

After the XX had been eluted, the column was washed with methanol. Evaporation of the methanol solution gave 4.5 g. of a brown solid (mp 85–102°; mass spectrum showed dimer XX A parent ion 972). It was treated with excess sodium ethoxide in ethanol at 150° for 8 hr. in a bomb tube. Workup gave a single product XIX (TLC and NMR).

In Example 20, ring closure of compound XIX is effected by heating the compound in a dry menstruum which is initially ethanol-toluene and which becomes toluene in the latter stages of the operation at a temperature in the range 75–110° C. This temperature range could be lowered somewhat but the reaction becomes very slow below 60° C. Temperatures above 110° C. can be used but at temperatures much beyond 120° C. undesirable reactions occur.

EXAMPLE 21

Example 21 shows the preparation of zearalane II by the following general reaction wherein X=10:

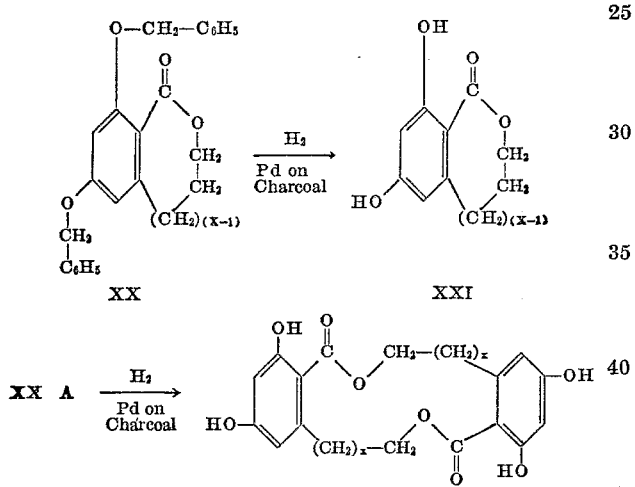

Zearalane II XXI. A solution of 2.5 g. (0.051 mol) of XX in 20 ml. of ethanol and 50 ml. of ethyl acetate with 1.5 g. of 5% palladium on charcoal and a few drops of triethylamine was hydrogenated at 25° and 1 atm. When 260 ml. (25°) of hydrogen had been consumed after 2 hr., the reaction mixture was filtered. The filtrate was evaporated to give a yellow semisolid. Thin layer chromatography as above showed one major component (R$_f$ 0.60), but some material remained at the origin. Its mass spectrum showed that dimer lactone XXI A (parent ion 612) was present. Dry column chromatography gave 1.5 g. of material (tlc, R$_f$ 0.60) that was then recrystallized from ether-pentane. The mp 121°122° was sharp, but again its mass spectrum showed traces of dimer. The recrystallized material was sublimed at 110° and high vacuum. Recrystallization of the sublimate from ether-pentane gave pure XXI: mp 123–124°; NMR (CD$_3$COCD$_3$, TMS)

δ11.70 (s, 1, 2-OH), 7.21 (s, 1, 4-OH), 6.31 (s, 2, ArCH), 4.39 (t, 2, J=5.0 Hz, —CH$_2$O—), 2.85 (m, 2, ArCH$_2$—) and 2.0–1.1-peak at 1.39 p.p.m. (m, 18, —CH$_2$(CH$_2$)$_9$—CH$_2$—); mass spectrum (70 e.v.) m/e (relative intensity) 306 (100), 178 (20), 177 (26), 169 (35), 168 (93), 164 (33), 163 (52), 151 (39), 150 (96), 124 (33), 69 (35), 55 (56), 43 (26), 41 (67). Anal. Calcd. for C$_{18}$H$_{26}$O$_4$: C, 70.56; H, 8.55. Found: C, 70.33; H, 8.60.

EXAMPLE 22

In Example 22, the compound 5-hexenal, XXII, is prepared by the pyrolysis of 3-hydroxy-1,5-hexadiene at a temperature of 380° C.

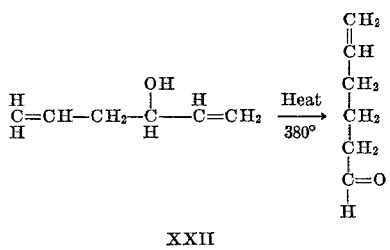

XXII

5-Hexenal, XXII. 190 g., 1.94 mol., of 3-hydroxy-1,5-hexadiene was slowly distilled through a 50 cm. column packed with 3 mm. Pyrex helices maintained at 380°. Fractional distillation of the pyrolysis mixture gave 111.2 g., 1.14 mol (59 percent), of 5-hexenal: bp 57.5° (57 mm.). The boiling point of this product is given as 120–121° (760 mm.) by Viola and Levassuer *J. Amer. Chem. Soc. 87*, 1150 (1965).

EXAMPLE 23

Example 23 gives the details of a method for preparing 2,7-octadienoic acid, XXIII, by the reaction of 5-hexenal, XXII, with malonic acid.

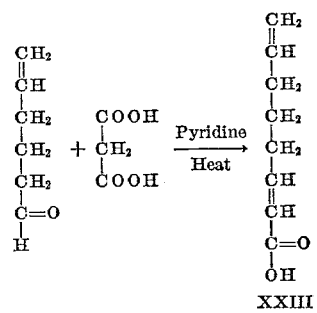

XXIII 2,7-Octadienoic acid XXIII. A reaction mixture containing 76.9 g., 0.784 mol, 5-hexenal XXII, 90.0 g., 0.865 mol, of malonic acid, and 145 ml. of pyridine was stirred at 25° under nitrogen for 60 hr. An additional 45.0 g. of malonic acid was added to it, and stirring was continued for 24 hr. at 25°. It was then heated on a steam bath until carbon dioxide evolution ceased (20 hr.). Water (145 ml.) was added to it, and the resulting mixture was extracted with ether (3 × 200 ml.). The extract was washed with dilute hydrochloric acid (2N, 2× 50 ml.), water (2× 50 ml.), and dried (Na$_2$SO$_4$). Fractional distillation gave 83.0 g., 0.593 mol (76 percent), of XXIII: bp 86–87° (0.15 mm.); NMR (CDCl$_3$, TMS) δ12.34 (s, 1, COOH), 7.26 and 6.98 (2 t, 1, J$_{AB}$=15.7 Hz, J$_{AX}$=7 Hz., CH$_2$CH=CH), 5.97 and 5.70 (2 t, 1, J$_{AB}$=15.7 Hz., J$_{BX}$=1 Hz., CHCOO), 5.72, 4.92 and 4.88 (3 m, 3, CH=CH$_2$), 2.12 (br m, 4, CH$_2$CH=CH), and 1.60 p.p.m. (br m, 2, CH$_2$CH$_2$CH$_2$). *Anal.* Calcd. for C$_8$H$_{12}$O$_2$: C, 68.6; H, 8.6. Found: C, 68.6; H, 8.7.

EXAMPLE 24

In Example 24, methyl 2,7-octadienoate is prepared by the following general reaction wherein X=4:

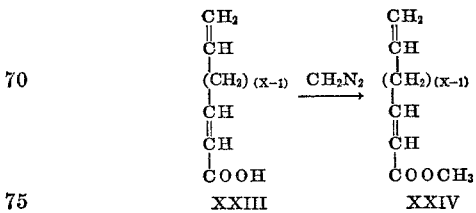

XXIII      XXIV

Methyl 2,7-octadienoate XXIV. A solution of diazomethane in ether was added to a cold (0°) solution of 83.0 g., 0.592 mol, of XXIII in 200 ml. of ether until a yellow color persisted. Evaporation of the reaction mixture gave 90.3 g. of crude XXIV that was fractionally distilled to give 80.2 g., 0.520 mol (88 percent) of XXIV: bp 44–45° (0.70 mm.); NMR (CDCl$_3$, TMS) $\delta$7.04 and 6.78 (2 t, 1, $J_{AB}$=15.7 Hz, $J_{AX}$=7 Hz., CH$_2$C$\underline{H}$=CH), 5.87 and 5.61 (2 t, 1, $J_{AB}$=15.7 Hz, $J_{BX}$=1 Hz., C$\underline{H}$CO), 5.72, 4.92 and 4.88 (3 m, 3, C$\underline{H}$=C$\underline{H}_2$), 3.67 (s, 3, C$\underline{H}_3$), 2.12 (br m, 4, $\underline{CH}_2$CH=CH), and 1.58 p.p.m. br m, 2, CH$_2\underline{CH}_2$CH$_2$). Anal. Calcd. for C$_9$H$_{14}$O$_2$: C, 70.2; H, 9.1. Found: C, 70.1; H, 9.2.

EXAMPLE 25

In Example 25, the sodium salt of ethyl 6-(4-pentenyl)-β-dihydroresorcylate and ethyl 6-(4-pentenyl)-β-dihydroresorcylate are formed by the following general reactions wherein X=4:

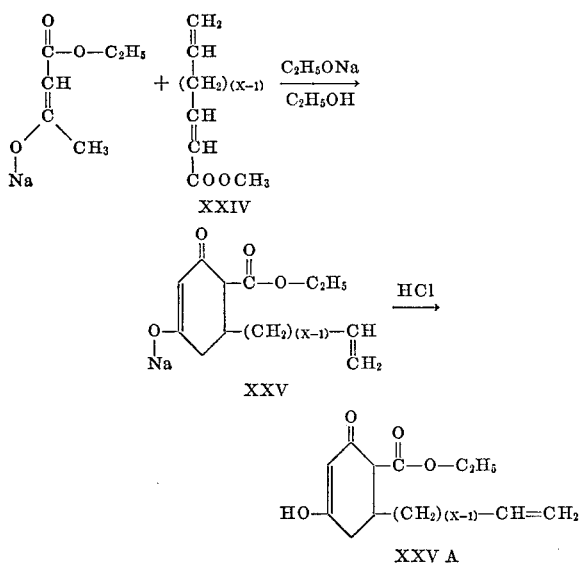

Sodium salt of ethyl 6-(4-pentenyl)-β-dihydroresorcylate, XXV. 81.4 g., 0.626 mol, of freshly distilled ethyl acetoacetate was added dropwise to a stirred solution of sodium ethoxide prepared from 14.4 g., 0.626 g-atom of sodium and 200 ml. of ethanol under nitrogen. The resulting solution was held at reflux while 80.2 g., 0.521 mol, of XXIV was added dropwise, and then such heating was continued with mechanical stirring for 22 hrs. The solid that precipitated during the reaction and while the mixture was cooled to 0° was removed on a filter, and it was washed with ether to give 110.80 g., 0.404 mol (78 percent), of white XXV: NMR (D$_2$O, DSS, integration of some ring hydrogen atoms not given since they exchanged) $\delta$5.72, 4.92 and 4.88 (3 m, 3, C$\underline{H}_2$=C$\underline{H}$), 4.22 (q, 2, J=7 Hz., COOC$\underline{H}_2$), 3.18 (d, J=10 Hz., $\underline{H}$CCOO), 2.20 (m, OCC$\underline{H}_2$CH), 2.00 (br m, 2, C$\underline{H}_2$CH=CH$_2$), 1.33 (br m, 5, C$\underline{H}$(C$\underline{H}_2$)$_2$CH$_2$), and 1.26 p.p.m. (t, 3, J=7 Hz., C$\underline{H}_3$).

Then a solution of 3.00 g, 0.0109 mol, of XXV in 50 ml. of water was acidified with 3N hydrochloric acid and the resulting mixture was extracted with ether (4× 25 ml.). The extract was washed with water (4× 25 ml.), dried (MgSO$_4$), and evaporated in a vacuum rotary evaporator (Rinco) to give a residue which crystallized from ligroin (bp 60–68°), to give 2.37 g, 0.00942 mol (86 percent), of ethyl 6-(4-pentenyl)-β-dihydroresorcylate XXV A: mp 72.5–73.5°; NMR (CDCl$_3$, TMS) $\delta$12.32 (s, 0.2, 2-O$\underline{H}$), 9.75 (s, 0.8, 4-O$\underline{H}$), 5.72, 4.92 and 4.88 (3 m, 3, C$\underline{H}$=C$\underline{H}_2$), 5.52 (s, 0.8, 3-C$\underline{H}$), 4.29 and 4.22 (2 q, 2, J=7 Hz., COOC$\underline{H}_2$), 3.12 (s, 0.4, 3-C$\underline{H}_2$), 3.15 (d, 0.8 J=10 Hz., 1-C$\underline{H}$), 2.45 (m, ca. 2, 5-C$\underline{H}_2$), 2.06 (br m, 2, C$\underline{H}_2$CH=CH$_2$), 1.36 (br m, 5, C$\underline{H}$(C$\underline{H}_2$)$_2$—CH$_2$), and 1.29 p.p.m. (t, 3, J=7 Hz., C$\underline{H}_3$). Anal. Calcd. for C$_{14}$H$_{20}$O$_4$: C, 66.7; H, 8.0. Found: C, 66.7; H, 8.0.

EXAMPLE 26

Example 26 provides a method for the preparation of the sodium salt of methyl 6-(4-pentenyl)-β-dihydroresorcylate and of methyl 6-(4-pentenyl)-β-resorcylate by the following general reaction wherein X=4:

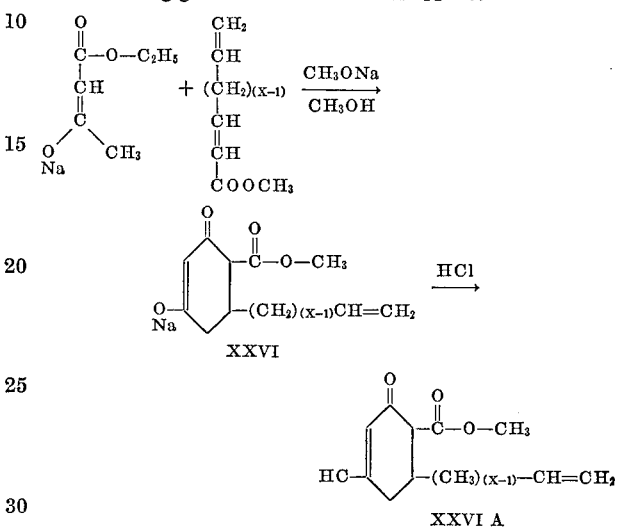

Sodium salt of methyl 6-(4-pentenyl)-β-dihydroresorcylate, XXVI. The reaction mixture was prepared by dropwise addition of 70.7 g., 0.598 mol, of ethyl acetoacetate to a solution of 32.3 g., 0.598 mol, of sodium methoxide in 130 ml. of methanol stirred under nitrogen, and then 74.2 g., 0.482 mol, of XXIV was also added dropwise. It was held at reflux with mechanical stirring for 20 hrs. About 60 ml. of its solvent was removed under vacuum, and it was cooled to 0°. A precipitate that formed during the above was removed on a filter and washed with ether until it was white to give 84.7 g., 0.326 mol (68 percent), of XXVI: NMR (D$_2$O, DSS): again exchange of hydrogen atoms on the ring occurred) $\delta$5.72, 4.92 and 4.88 (3 m, 3, C$\underline{H}$=C$\underline{H}_2$), 5.07 (s, OCC$\underline{H}$CO), 3.18 (d, J=10 Hz., $\underline{H}$CCOO), 2.20 (m, OCC$\underline{H}_2$CH), 2.00 (br m, 2, (C$\underline{H}_2$CH=CH$_2$), and 1.33 p.p.m. (br m, 5, C$\underline{H}$(C$\underline{H}_2$)$_2$CH$_2$).

The NMR spectrum is nearly the same as XXV above, except for the alkoxy absorptions.

EXAMPLE 27

Example 27 illustrates the preparation of methyl 3-bromo-6-(4-pentenyl)-β-dihydroresorcylate by the following general reaction wherein X=4:

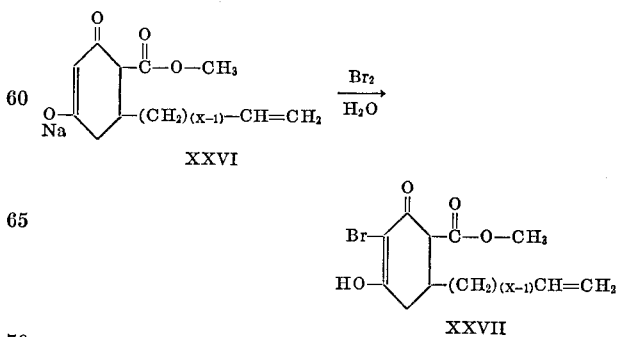

Methyl 3-bromo-6-(4-pentenyl)-β - dihydroresorcylate XXVII. A solution of 58.2 g., 0.326 mol, of bromine and 193.1 g., 187 mol, of sodium bromide in 200 ml. of water was added dropwise over 6 hrs. to a rapidly stirred solution of 84.7 g., 0.326 mol, of XXVI in 700 ml. of water cooled to 0°. After 30 min., the solid that had precipitated was removed by filtration. It was dissolved in 200 ml. of ether, and the resulting solution was washed with water (3× 150 ml.), and briefly dried (MgSO$_4$). It was evaporated in a vacuum rotary evaporator (Rinco, 25°), and the residue was recrystallized from 200 ml. of ether and pentane to give 70.4 g., 0.222 mol (68 percent), of white crystalline XXVII: mp 91–93°; NMR (CDCl$_3$, TMS) δ8.10 (s, 1, 4-OH̲), 5.72, 4.92 and 4.88 (3 m, 3,

CH̲=CH$_2$), 3.77 (s, 3, CH̲$_3$), 3.35 (d, 1, J=10 Hz., H̲CCOO), 2.72 (dd, 1, J$_{AB}$=20.4 Hz., J$_{AX}$=11.0 Hz., OCCH̲$_2$CH), 2.43 (dd, 1, J$_{AB}$=20.4 Hz., J$_{BX}$=8.6 Hz., OCCH̲$_2$CH), 2.06 (br m, 2, CH̲$_2$CH=CH$_2$), and 1.45 p.p.m. (br m, 5, CH̲(CH$_2$)$_2$CH̲$_2$). Anal. Calcd. for C$_{13}$H$_{17}$O$_3$Br: C, 49.2; H, 5.4; Br, 25.2. Found: C, 48.9; H, 5.7; Br, 25.2.

In Example 27, the temperature at which the reaction of bromine with Compound XXVI is allowed to occur is kept at 0° C. in order to minimize the reaction of bromine with the double bond in the side chain of the compound. Temperatures up to 25° C. could be used for this reaction but 0° C. is preferred. A lower temperature limit of about −10° C. is set since the rate of the desired reaction becomes too low at temperatures much below −10° C., and the reaction mixture would tend to freeze solid at temperatures much below −10° C.

EXAMPLE 28

In Example 28, methyl 6-(4-pentenyl)-β-resorcylate is produced by the following general reactions wherein X=4:

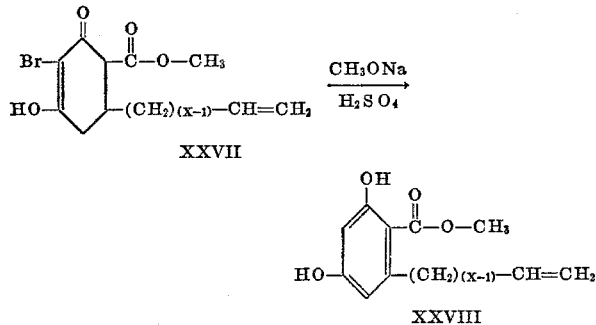

XXVIII

Methyl 6-(4-pentenyl)-β-resorcylate XXVIII. A solution of 21.5 g., 0.0678 mol, of XXVII and sodium methoxide (prepared from 15.6 g., 0.678 g.-atom of sodium) in 350 ml. of anhydrous methanol was maintained at reflux under nitrogen for 9 hr. Then 200 ml. of methanol was evaporated under vacuum. The reaction mixture was held at 0° while enough water to give 400 ml. of the mixture was added to it. It was acidified with sulfuric acid (6 N), and extracted with ether (3 × 200 ml.). The extract was washed with water (4× 200 ml.), and it was decolorized with charcoal, and evaporated (Rinco) to yield 14.9 g., 0.0632 mol (93 percent), of crude XXVIII. Purification by dry column chromatography (300 g., Silica Gel H, 10 percent ethyl ether in methylene chloride) yielded fractions that gave product that was recrystallized from ligroin (60–68°) to give 8.82 g., 0.0373 mol (55 percent), of pure XXVIII: m.p. 55–56°; NMR (CDCl$_3$, TMS) δ11.83 (s, 1, hydrogen bonded 2—OH̲), 6.90 (s, 1, 4—OH̲), 6.33 and 6.30 (2 d, 2, J=2 Hz., aromatic CH̲), 5.72, 4.92 and 4.88 (3 m, 3, CH̲=CH̲$_2$), 3.82 (s, 3, CH̲$_2$), 2.82 (t, 2, J=7 Hz., ArCH̲$_2$), 2.08 (br m, 2, CH$_2$CH=CH$_2$), and 1.64 p.p.m. (br m, 2, CH$_2$CH̲$_2$CH$_2$). Anal. Calcd. for C$_{13}$H$_{16}$O$_4$: C, 66.2; H, 6.8. Found: C, 66.1; H, 6.7.

In Example 28, the dehydrobromination of compound XXVII can be effected at temperatures in the range 60° C.–120° C. but a temperature near 65° C. is preferred. At a temperature of 65° C. the rate of dehydrobromination is reasonably fast.

The dehydrobromination step could be carried out in an alcohol other than methanol, for example ehtanol or butanol.

EXAMPLE 29

Example 29 delineates the conditions for the production of ethyl 6-(4-pentenyl)-β-resorcylate by the following general reactions wherein X=4:

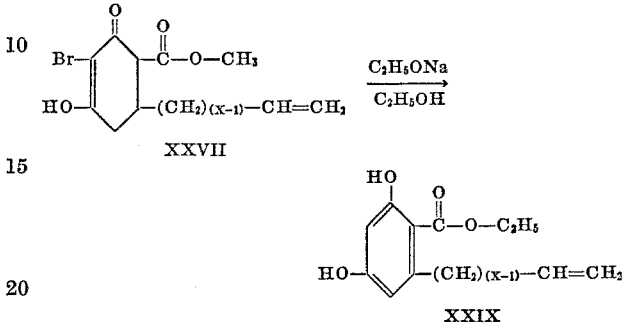

XXIX

Ethyl 6-(4-pentenyl)-β-resorcylate XXIX. A solution containing 19.33 g., 0.0610 mol, of XXVII, and sodium ethoxide (prepared from 9.00 g., 0.391 g.-atom, of sodium and in the 250 ml. of ethanol) was held at reflux under nitrogen for 6 hr., and then it was evaporated under vacuum until its volume was about 100 ml. It was diluted with water to 300 ml., and acidified with sulfuric acid (6 N) while it was held at 0°. The resulting mixture was extracted with ether (3× 150 ml.). The extract was then washed with water (4× 100 ml.), decolorized with charcoal, and evaporated in a vacuum rotary evaporator (Rinco) to yield 14.0 g., 0.0562 mol (92 percent), of crude XXIX. Dry column chromatography (300 g. Silica Gel H, 10 percent ethyl ether in methylene chloride) gave 9.15 g., 0.0366 mol (60 percent), of XXIX: NMR (CDCl$_3$, TMS) δ11.95 (s, 1, 2-OH̲), 7.42 (s, 1, 4-OH̲), 6.33 and 6.30 (2 d, 2, J=2 Hz., aromatic CH̲), 5.72, 4.92 and 4.88 (3 m, 3, CH̲=CH$_2$), 4.40 (q, 2, J=7 Hz., COOCH̲$_2$), 2.85 (t, 2, J=7 Hz., ArCH̲$_2$), 2.03 (m, 2, CH̲$_2$CH=CH$_2$), 1.64 (br m, 2, CH$_2$CH̲$_2$CH$_2$), and 1.40 p.p.m. (t, 3, J=7 Hz., CH̲$_3$). Except for the expected differences, this NMR spectrum is the same as that of XXVIII above.

EXAMPLE 30

In Example 30, ethyl 6-(4-pentenyl)-β-resorcylate dibenzyl ether is prepared by the following general reaction wherein X=4:

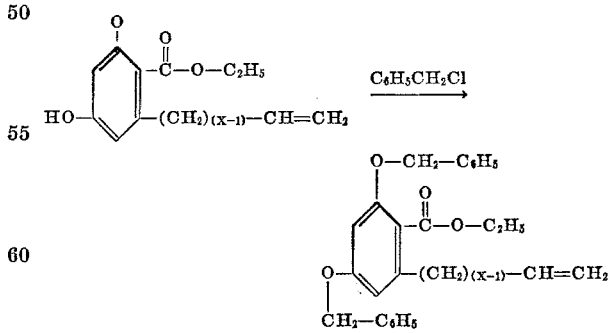

XXX

Ethyl 6-(4-pentenyl)-β-resorcylate dibenzyl ether XXX. A mixture of 31.5 g., 0.126 mol, XXIX, 60.5 g., of anhydrous potassium carbonate, and 31.5 ml., 0.274 mol, of benzyl chloride in 300 ml. of dimethyl sulfoxide was stirred on a steam bath for 6 hr. 1.0 l. of water was added to it while it was stirred, and then it was held overnight at −15°. The product that had crystallized was collected on a filter, and it was recrystallized from a mixture of ethyl ether and ligroin (b.p. 60–68°) to give 45.5 g., 0.106 mol (84 percent), of XXX: m.p. 49–51°; NMR (CDCl$_3$, TMS) δ7.32 (m, 10, C$_6$H̲$_5$), 6.44 (s, 2, aromatic C$\underline{H}$), 5.72, 4.92 and 4.88 (3 m, 3, C$\underline{H}$=C$\underline{H}_2$), 4.98 and 4.96 (2 s, 4, C$_6$H$_5$C$\underline{H}_2$), 4.28 (q, 2, J=7 Hz., COOC$\underline{H}_2$), 2.58 (t, 2, J=7 Hz., ArC$\underline{H}_2$), 2.00 (m, 2, C$\underline{H}_2$CH=CH), 1.64 (br m, 2, CH$_2$C$\underline{H}_2$CH$_2$), and 1.23 p.p.m. (t, 3, J=7 Hz., C$\underline{H}_3$). Anal. Calcd. for C$_{28}$H$_{30}$O$_4$: C, 78.2; H, 7.0. Found: C, 78.0; H, 6.9.

EXAMPLE 31

In Example 31, ethyl 2,4-bis(benzyloxy)-6-(5-hydroxypentenyl)-benzoate is formed by the following general reactions wherein X=4:

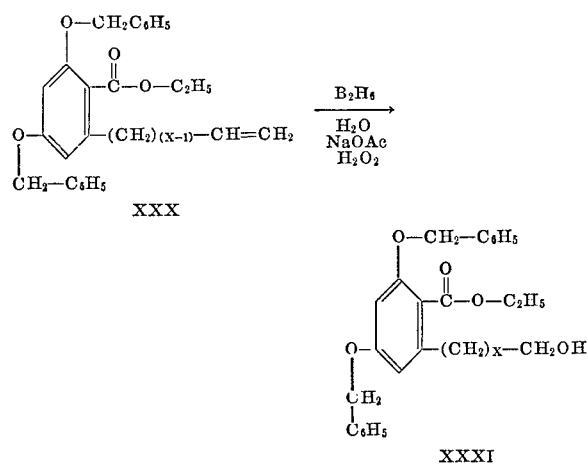

Ethyl 2,4 - bis(benzyloxy)-6-(5-hydroxypentyl)-benzoate, XXXI. A solution of 8.6 g. (0.0197 mol) of XXX in 50 ml. of tetrahydrofuran was stirred at 0° under nitrogen while 10 ml. of a 0.93 M-diborane (0.0093 mol) solution in the same solvent was dropped in over a period of 30 minutes. Stirring was continued for 5 hours at 25° C. The product was then cooled to 0° C. and the following sequence of reagents added while the temperature was held at 0° C.

(a) Dropwise addition of 10 ml. of water.
(b) Addition of 5 ml. of 3 N sodium acetate solution.
(c) Addition of 5 ml. of 30% hydrogen peroxide.

The reaction mixture was then held for an additional hour at 0° C.

The reaction mixture was stirred while 100 ml. of ether was added to it. The two-phase mixture was separated, and the aqueous part was extracted further with ether (3× 100 ml.). The extract was dried (MgSO$_4$) and then evaporated to give 7.9 g. of a yellow oil. Its nmr spectrum (CDCl$_3$, TMS) showed that it was predominantly XXXI: δ7.25 (s, 10, C$_6$$\underline{H}_5$CH$_2$—), 6.34 (s, 2, ArC$\underline{H}$), 4.88 (s, 4, C$_6$H$_5$C$\underline{H}_2$—), 4.23 (q, 2, J=7.0 Hz, CH$_3$C$\underline{H}_2$O—), 3.70 (m, 2, —C$\underline{H}_2$OH), 2.53 (m, 2, ArC$\underline{H}_2$—), 2.0–0.9 with peak at 1.42 (m, 6, —CH$_2$(C$\underline{H}_2$)$_3$—CH$_2$—), and 1.22 p.p.m. (t, 3, J=6.7 Hz., C$\underline{H}_3$CH$_2$O—).

The reaction of the olefinic compound XXX with diborane, water, hydrogen peroxide and sodium acetate solution in Example 31 is carried out in the temperature range 0° C. to 25° C. This temperature range can be extended to 0° C. to 50° C., if it is desired to do so. At temperatures below 0° C. the reaction rates are low, and above 50° C. undesirable side reactions occur.

EXAMPLE 32

Example 32 gives conditions for the preparation of the dimeric dilactone from 2,4-bis(benzyloxy)-6-(-hydroxypentyl)-benzoic acid by the following general reaction where in X=4:

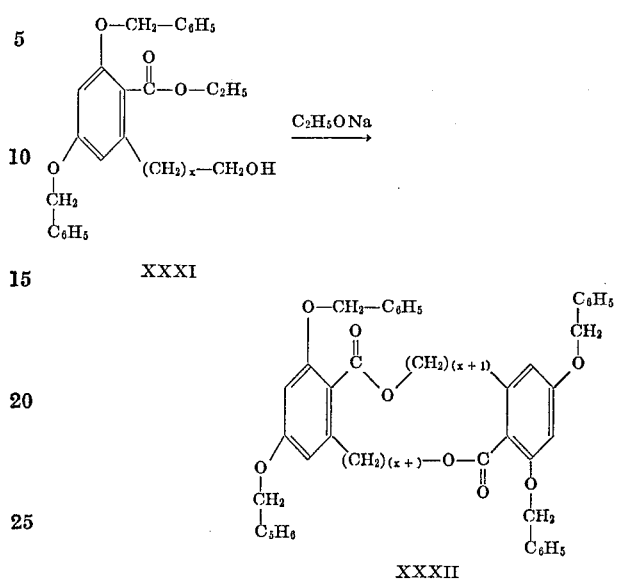

Dimeric dilactone from 2,4 - bis(benzyloxy)-6-(5-hydroxypentyl)-benzoic acid XXXII. A reaction mixture containing 6.72 g. (0.0155 mol) of XXXI, sodium ethoxide solution made from 0.63 g. (0.027 g.-atom) of sodium and 50 ml. of anhydrous ethanol, and 700 ml. of toluene (dried by treatment with sodium) was distilled until all of the ethanol-toluene azeotrope had been removed. Slow distillation (2 ml./hr.) was continued for 36 hr. The mixture was allowed to cool to 25°, and 100 ml. of water was added to it. Then 3 N-hydrochloric acid was added until its aqueous phase was acidic. The toluene layer was separated, the aqueous one was extracted with ether (4× 100 ml.), and the combined solution was dried (MgSO$_4$).

Dry column chromatography gave 2.8 g. (0.0035 mol, 45%) of crude product that was recrystallized from excess methylene chloride (150 ml. per gram of XXXII) to give XXXII: m.p. 203–204° C.; NMR (CDCl$_3$ very dilute solution, TMS) δ7.33 (s, 10, C$_6$$\underline{H}_5$CH$_2$—), 6.42 (s, 2, ArC$\underline{H}$), 5.00 (s, 4, C$_6$H$_5$C$\underline{H}_2$—), 4.25 (m, 2, —C$\underline{H}_2$O—), 2.52 (m, 2, ArC$\underline{H}_2$—), and 2.1–0.9 p.p.m. (m, 6, —CH$_2$(C$\underline{H}_2$)$_3$CH$_2$—); mass spectrum (70 e.v.) m/e (relative intensity) no parent ion, 713 (M-91, 3), 712 (3.3), 623 (2.2), 403 (3), 384 (3), 313 (3), 295 (3), 181 (5), 180 (5), 91 (100), 65 (6). Anal. Calcd. for C$_{52}$H$_{52}$O$_8$: C, 77.59; H, 6.51. Found: C, 77.55; H, 6.60. Substance XXXII was also almost insoluble in most organic solvents, and initial attempts at its hydrogenolysis gave only partial reaction.

The process of the present invention as illustrated by the foregoing examples has protected the hydroxyl groups of the resorcylic acid moiety by forming benzyl ethers in compounds VI, VII, VIII, VIII A, XVIII, XIX, XX, XX A, XXX, XXXI, and XXXI. It will be obvious to anyone skilled in the art that other protecting groups could be used in place of the benzyl group, for example, methyl, ethyl, butyl, cyclopentyl, cyclohexyl and the like.

It will naturally occur to a skilled organic chemist that the large ring (so-called B-ring) of the zearalane II compounds can be extensively modified by the choice of the aldehyde used as a starting material in the sequence of reactions shown in Chart I, for example.

Applicants consider all such obvious modifications to be the full equivalent of the embodiments specifically described herein and to fall within the scope of their invention.

We claim:
1. A compound of the formula

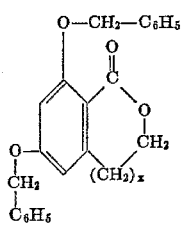

wherein X is an integer having the value 1 to 13 inclusive.
2. The compound of claim 1 where X is four.
3. The compound of claim 1 where X is nine.
4. The compound of claim 1 where X is ten.
5. A compound of the formula

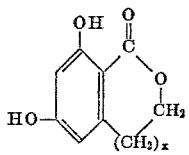

wherein X is an integer having the value 1 to 13 inclusive.
6. The compound of claim 5 where X is four.
7. The compound of claim 5 where X is nine.
8. The compound of claim 5 where X is ten.
9. A method for preparing a compound

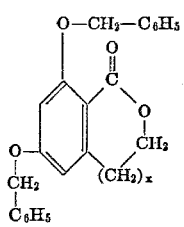

comprising reacting a compound

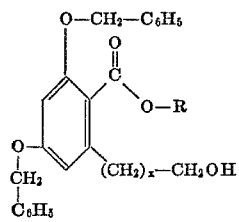

with sodium ethoxide in an anhydrous ethanol-toluene menstruum in an atmosphere substantially devoid of oxygen while distilling the ethanol-toluene azeotrope to remove all of the ethanol and part of the toluene at a temperature in the range of 60° C. to 120° C., wherein R is either methyl or ethyl and where X is an integer having the value 1 to 13 inclusive.

10. A method of preparing the compound where X is four according to the method of claim 9.
11. A method of preparing the compound where X is nine according to the method of claim 9.
12. A method of preparing the compound where X is ten according to the method of claim 9.
13. A method of preparing a compound

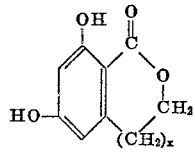

comprising hydrogenating a compound

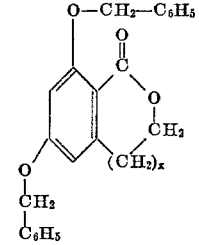

in a menstrum of ethanol and ethyl acetate containing a small amount of triethylamine under a hydrogen pressure of substantially one atmosphere and at a temperature of about 25° C. using palladium on charcoal as a catalyst, wherein X is an integer having the value 1 to 13 inclusive.
14. A method of preparing the compound where X is four according to the method of Claim 13.
15. A method of preparing the compound where X is nine according to the method of claim 13.
16. A method of preparing the compound where X is ten according to the method of claim 13.
17. A compound of the formula

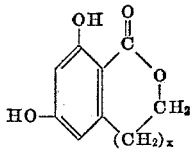

wherein X is an integer of 1 to 8 or 10 to 13.

References Cited
UNITED STATES PATENTS
3,535,343   10/1970   Cross et al. _____ 260—343.2

JOHN M. FORD, Primary Examiner

U.S. Cl. X.R.

260—343.2 F, 343.3, 473 S; 424—279